(12) United States Patent
Cheng et al.

(10) Patent No.: US 8,903,251 B2
(45) Date of Patent: Dec. 2, 2014

(54) POWER SAVING IN PASSIVE OPTICAL NETWORKS USING DYNAMIC DATA RATE SCALING

(75) Inventors: Ning Cheng, Santa Clara, CA (US); Frank J. Effenberger, Colts Neck, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 239 days.

(21) Appl. No.: 13/178,192

(22) Filed: Jul. 7, 2011

(65) Prior Publication Data

US 2012/0008937 A1  Jan. 12, 2012

Related U.S. Application Data

(60) Provisional application No. 61/362,064, filed on Jul. 7, 2010.

(51) Int. Cl.
*H04B 10/20* (2006.01)
*H04B 10/00* (2013.01)
*H04J 14/00* (2006.01)
*H04B 10/67* (2013.01)
*H04Q 11/00* (2006.01)

(52) U.S. Cl.
CPC .............. *H04J 14/00* (2013.01); *H04B 10/671* (2013.01); *H04Q 11/0067* (2013.01); *H04Q 2011/0079* (2013.01)
USPC .............................. 398/168; 398/58; 398/153

(58) Field of Classification Search
CPC ........ H04B 10/60; H04B 10/66; H04B 10/67; H04B 10/671; H04B 10/672; H04B 10/673; H04B 10/693; H04B 10/6931; H04B 10/6932; H04B 10/6933
See application file for complete search history.

(56) References Cited

U.S. PATENT DOCUMENTS 6,728,248 B1 * 4/2004 Uchida et al. .............. 370/395.1
2006/0067710 A1 * 3/2006 Liu et al. ...................... 398/202

(Continued)

FOREIGN PATENT DOCUMENTS

WO      2006048859 A2     5/2006

OTHER PUBLICATIONS

"Information Technology, Telecommunications and Information Exchange Between Systems, Local and Metropolitan Area Networks, Specific Requirements, Part 3: Carrier Sense Multiple Access With Collision Detection (CSMA/CD) Access Method and Physical Layer Specifications," IEEE 802.3 ah™, 2005, 417 pages.

(Continued)

*Primary Examiner* — Darren E Wolf
(74) *Attorney, Agent, or Firm* — Conley Rose, P.C.; Grant Rodolph; Jonathan K. Polk

(57) ABSTRACT

An Optical Network Unit (ONU) in a Passive Optical Network (PON), the ONU comprising: a receiver module configured to receive a first rate selection signal from an optical line terminal (OLT) that indicates a reduced rate mode, and a component comprised within the receiver module, the component configured to transition from a normal operation mode to the reduced rate mode in response to the receiver module receiving the first rate selection signal, wherein operating in the normal operation mode comprises receiving a downstream signal from the OLT at a nominal data rate, and wherein operating in the reduced rate mode comprises receiving the downstream signal from the OLT at a reduced data rate that is less than the nominal data rate but greater than zero.

20 Claims, 8 Drawing Sheets

(56) References Cited

U.S. PATENT DOCUMENTS

| | | | |
|---|---|---|---|
| 2006/0133809 A1* | 6/2006 | Chow et al. | 398/66 |
| 2007/0109974 A1 | 5/2007 | Cutillo et al. | |
| 2009/0225914 A1 | 9/2009 | Ide et al. | |
| 2009/0245790 A1* | 10/2009 | Mizutani et al. | 398/43 |
| 2009/0263132 A1* | 10/2009 | Rafel et al. | 398/66 |
| 2010/0310252 A1* | 12/2010 | Healey | 398/6 |

OTHER PUBLICATIONS

"Series G: Transmission Systems and Media Digital Systems and Networks, Digital Sections and Digital Line System-Optical Line Systems for Local and Access Networks, Gigabit-capable Passive Optical Networks (G-PON): Transmission Convergence Layer Specification," ITU-T 984.3, Mar. 2008, 146 pages.

Foreign Communication From a Related Counterpart Application—International Search Report, PCT/US2011/043204, Oct. 7, 2011, 5 pages.

Foreign Communication From a Related Counterpart Application—Written Opinion, PCT/US2011/043204, Oct. 7, 2011, 6 pages.

"Series G: Transmission Systems and Media, Digital Systems and Networks, Digital Sections and Digital Line System-Optical Line Systems for Local and Access Networks, Broadband Optical Access Systems Based on Passive Networks (PON)," ITUT G. 983.1, Jan. 2005, pp. 1-124.

"Series G: Transmission Systems and Media, Digital Systems and Networks, Digital Sections and Digital Line Systems-Optical Line Systems for Local and Access Networks, ONT Management and Control Interface Specification for B-PON," ITUT G. 983.2, Jul. 2005, pp. 1-370.

"Series G: Transmission Systems and Media, Digital Systems and Networks, Digital Sections and Digital Line Systems-Optical Line Systems for Local and Access Networks, a Broadband Optical Access System With Increased Service Capability by Wavelength Allocation," ITUT G. 983.3, Mar. 2001, pp. 1-59.

"Series G: Transmission Systems and Media, Digital Systems and Networks, Digital Sections and Digital Line System-Optical Line Systems for Local and Access Networks, a Broadband Optical Access System with Increased Service Capability Using Dynamic Bandwidth Assignment," ITUT G. 983.4, Nov. 2001, pp. 1-92.

"Series G: Transmission Systems and Media, Digital Systems and Networks, Digital Sections and Digital Line System-Optical Line Systems for Local and Access Networks, a Broadband Optical Access System with Enhanced Survivability" ITUT G. 983.5, Jan. 2002, pp. 1-60.

"Series G: Transmission Systems and Media, Digital Systems and Networks, Digital Sections and Digital Line Systems-Optical Line Systems for Local and Access Networks, Gigabit-Capable Passive Optical Networks (GPON): General Characteristics," ITUT G.984.1, Mar. 2008, pp. 1-43.

"Series G: Transmission Systems and Media, Digital Systems and Networks, Digital Sections and Digital Line Systems—Optical Line Systems for Local and Access Networks,Gigabit-Capable Passive Optical Networks (GPON): Physical Media Dependent (PMD) Layer Specification," ITUT G.984.2, Mar. 2003, pp. 1-38.

"Series G: Transmission Systems and Media, Digital Systems and Networks, Digital Sections and Digital Line SystemOptical Line Systems for Local and Access Networks, Gigabit-Capable Passive Optical Networks (G-PON): ONT Management and Control Interface Specification," ITUT G. 984.4, Feb. 2008, pp. 1-430.

"Series G: Transmission Systems and Media, Digital Systems and Networks—Digital Sections and Digital Line System—Optical Line Systems for Local and Access Networks—Gigabit-capable Passive Optical Networks (G-PON): Transmission Convergence Layer Specification," International Telecommunication Union ITU-T G.984.3, Mar. 2008, 146 pages.

* cited by examiner

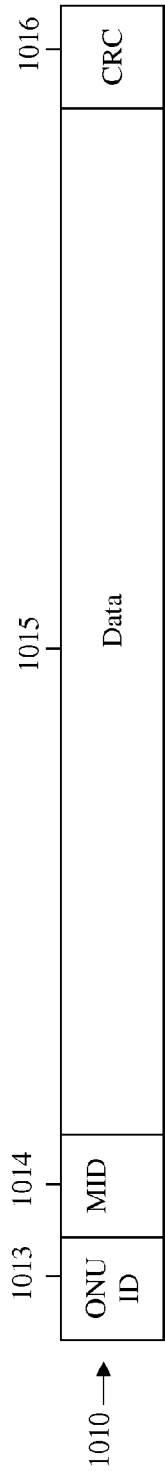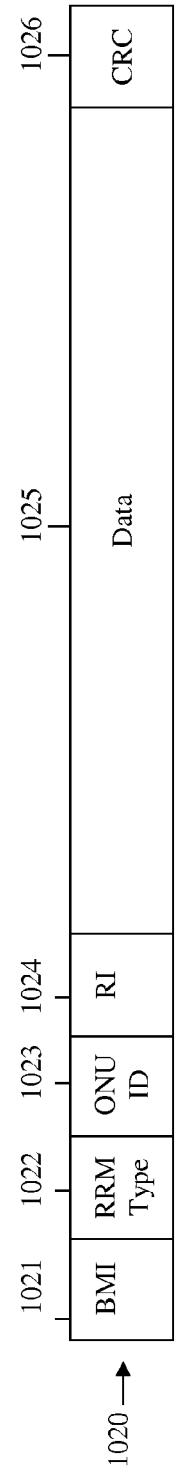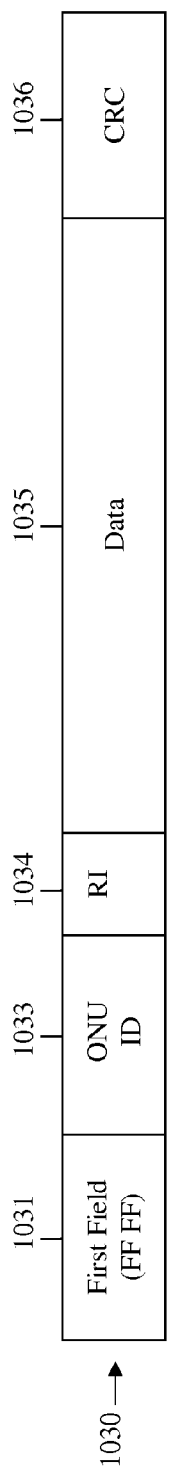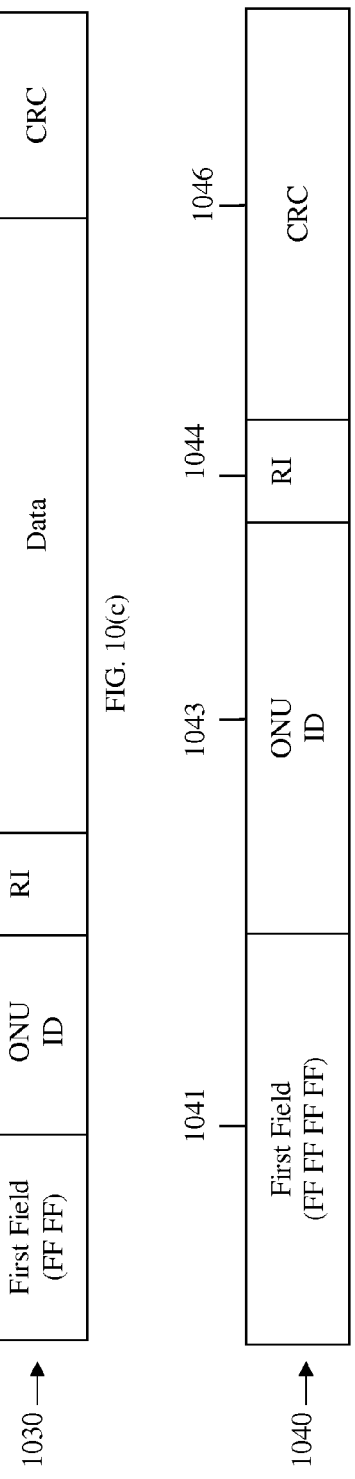

POWER SAVING IN PASSIVE OPTICAL NETWORKS USING DYNAMIC DATA RATE SCALING

CROSS-REFERENCE TO RELATED APPLICATIONS

The present application claims priority to U.S. Provisional Patent Application Ser. No. 61/362,064, filed Jul. 7, 2010 by Ning Cheng et al., and entitled "Power Saving in Passive Optical Networks Using Dynamic Data Rate Scaling", which are incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is one system for providing network access over "the last mile." The PON is a point to multi-point network comprised of an optical line terminal (OLT) at the central office, an optical distribution network (ODN), and a plurality of optical network units (ONUs) at the customer premises. In current PON systems, the OLT broadcasts a downstream optical signal to the plurality of ONUs via the ODN. The downstream optical signal may be a wavelength division multiplexed (WDM) optical signal comprising a plurality of wavebands (e.g., optical channels carrying an individual optical signal), where each waveband is assigned to a corresponding ONU or cluster of ONUs. Upon reception, each ONU may filter out wavebands assigned to other ONUs from the WDM downstream optical signal to isolate their assigned waveband. This may allow the ONU to obtain its own optical signal (i.e., the optical signal intended for the ONU), while ignoring optical signals intended for other ONUs. Some PONs may have one or more control and/or management channels, such as the physical layer operations, administration, and maintenance (PLOAM) channel described in International Telecommunications Union (ITU) Standardization Section (ITU-T) publication G.984.3, which is incorporated by reference herein as if reproduced in its entirety.

One of the central goals in communications technology is to reduce power consumption without substantially reducing service quality. Currently, information and communications technology account for between two percent and ten percent of worldwide energy consumption. Consequently the governments of many countries have begun to promulgate and enforce energy efficiency regulations aimed at communications providers. PONs are generally more energy efficient than conventional copper wire access technologies, e.g., Digital Subscriber Line (DSL) and coaxial cable (coax), but optical access nevertheless consumes a substantial amount of global energy resources. Specifically, approximately eighty million fiber to the premises (FTTP) users consume between five and ten terawatt (TW) hours (TWhrs) of electricity per year.

ONUs have been identified as an area of focus for reducing energy consumption in PONs because they consume more than 60 percent of the total power in the PON. Additionally, ONUs may potentially achieve significant power savings without substantially reducing service quality because ONUs oftentimes experience extended idle periods (e.g., periods where little or no downstream information is being sent or received), and therefore a reduction in performance during these periods (e.g., due to power savings measures) may not substantially reduce effective service quality as perceived by the client.

SUMMARY

Disclosed herein—Awaiting Finalized Claim set an ONU in a Passive Optical Network (PON), the ONU comprising a receiver module configured to receive a first rate selection signal from an OLT that indicates a reduced rate mode, and a component comprised within the receiver module, the component configured to transition from a normal operation mode to the reduced rate mode in response to the receiver module receiving the first rate selection signal, wherein operating in the normal operation mode comprises receiving a downstream signal from the OLT at a nominal data rate, and wherein operating in the reduced rate mode comprises receiving the downstream signal from the OLT at a reduced data rate that is less than the nominal data rate but greater than zero.

Also disclosed herein is a method comprising determining, by an OLT, that a first buffer length fails to exceed a first threshold, wherein the first buffer length is associated with a traffic container (T-CONT) of a first channel assigned to a first ONU, sending, by the OLT, a first rate selection signal to the first ONU in response to determining that the first buffer length fails to exceed the first threshold, wherein the first rate selection signal indicates a reduced data rate that is less than a nominal data rate, and broadcasting, by the OLT, a downstream signal comprising the first channel to the ONU subsequent to sending the first rate selection signal to the ONU, wherein the first channel comprises an effective data rate that is about equal to the reduced data rate.

Also disclosed herein is a method executed by an ONU in a PON, the method comprising receiving a downstream signal from an OLT while operating in a normal operation mode, wherein the downstream signal is received at a nominal data rate while operating in the normal operation mode, transitioning from the normal operation mode to a reduced rate mode upon receiving a first rate selection signal from the OLT, and receiving the downstream signal at a reduced data rate subsequent to transition from the normal operation mode to the reduced rate mode, wherein the reduced data rate is less than the nominal data rate, and wherein the ONU consumes power at a substantially lower rate while operating in the reduced rate mode than while operating in the normal operation mode.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 10(a) is an illustration of a PLOAM message according to the prior art.

FIGS. 10(b), 10(c), and 10(d) are illustrations of different embodiments of PLOAM messages according to one or more aspects of this disclosure.

DETAILED DESCRIPTION

Figure 1:
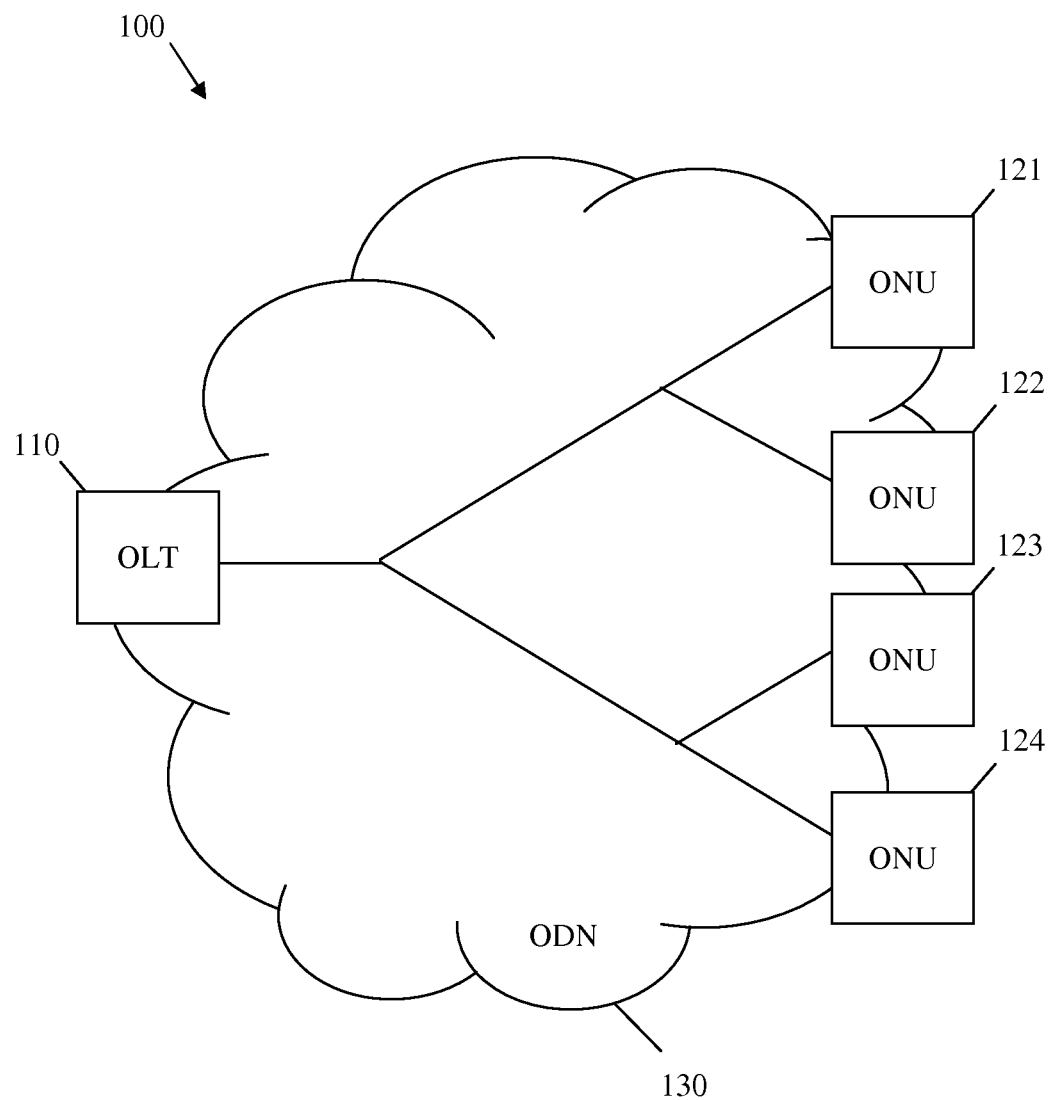
FIG. 1 is a schematic diagram of an embodiment of a PON.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

One strategy for reducing power consumption in ONUs may be to allow the ONUs to enter a doze/sleep mode during idle periods, as is disclosed in ITU-T Series G: Supplement 45 (05/2009) entitled "GPON power conservation", which is incorporated herein by reference as if reproduced in its entirety. The ONU may carry out this strategy by powering down or turning off its optical receiver. Although the ONU may achieve significant power savings while operating in the doze/sleep mode, the ONU may be unable to receive any downstream information from the OLT (e.g., may be unreachable by the OLT). Accordingly, the ONU may be configured to occasionally wake up from the doze/sleep mode to see if any downstream communications are ready to be received. For instance, the ONU may be programmed to power up or turn on its receiver periodically (e.g., every ten seconds, every one second, etc.) and check with the OLT to see if any downstream data is ready to be received, e.g., by performing a handshake protocol or other initialization techniques. As used herein, the term "downstream data" may refer to substantive data, rather than overhead and/or control signaling that is used to establish/maintain the communications channel, e.g., clock synchronization information, operations and management information, etc.

One disadvantage to the sleep/doze mode strategy is that the ONUs operating in the sleep/doze mode may be unable to receive messages (e.g., emergency, or otherwise) between wakeups, and hence may be essentially absent from the network for periods of time (e.g., between wakeups in the sleep/doze cycle). Additionally, the ONU may use the downstream signal to synchronize an internal clock, and therefore may require some initialization period after the wake up before communications can be resumed. For instance, it may take 300 milliseconds (ms) or longer for an ONU to emerge from the sleep/doze mode and begin receiving downstream data from, or transmitting upstream data to, the OLT. As a result, ONUs currently in or emerging from a sleep/doze mode may experience reduced service quality due to resulting latencies. Another disadvantage may be that ONUs that are not quite idle, but instead are receiving only small amounts of data, may be unable to reduce their power consumption by entering the sleep/doze mode.

Disclosed herein is a method for improving energy efficiency in PONs by reducing the effective downstream data rate for ONUs during periods of reduced communication. An optical receiver's data rate may be somewhat proportional to the optical receiver's power consumption according to one or more aspects of this disclosure, and consequently a reduction in the effective downstream data rate may substantially reduce the power consumed by the ONU. Reducing the effective downstream data rate may correspond to reducing the rate in which the downstream signal is sampled by the ONU, rather than the line rate at which the downstream signal is sampled. Hence, the OLT may accommodate a reduced data rate by modifying the line coding scheme used to encode the optical data stream in the corresponding channel, rather than modifying the line rate of the downstream signal. ONUs receiving downstream communications at a reduced data rate may be said to operate in "a reduced rate mode", and unlike ONUs operating in a doze/sleep mode, may be capable of receiving downstream data (e.g., emergency messages) as well as maintaining clock synchronization with the OLT. Consequently, ONUs operating in a reduced rate mode may avoid some or all of the latencies associated with the doze/sleep mode. Additionally, ONUs that are not quite idle, but instead are receiving only small amounts of downstream data (e.g., less than ¾, ½, or ¼ of the maximum channel capacity) may reduce their power consumption while continuing to receive data at the reduced data rate. The ONU may enter into or emerge from the reduced rate mode in response to a rate selection signal (e.g., PLOAM messages) received from the OLT, or in response to detecting an amount of data being transmitted in their assigned downstream waveband or channel.

FIG. 1 illustrates one embodiment of a PON 100. The PON 100 comprises an OLT 110, a plurality of ONUs 121-124, and an ODN 130. The PON 100 is a communications network that does not require any active components to distribute data between the OLT 110 and the ONUs 121-124. Instead, the PON 100 uses the passive optical components in the ODN 130 to distribute data between the OLT 110 and the ONUs 121-124. Examples of suitable PONs 100 include the asynchronous transfer mode PON (APON) and the broadband PON (BPON) defined by the ITU-T G.983 standard, the Gigabit PON (GPON) defined by the ITU-T G.984 standard, the Ethernet PON (EPON) defined by the IEEE 802.3ah standard, 10 gigabits per second (Gbps) PON, and the wavelength division multiplexing PON (WPON), all of which are incorporated by reference as if reproduced in their entirety.

One component of the PON 100 may be the OLT 110. The OLT 110 may be any device that is configured to communicate with one or more of the ONUs 121-124 and another network (not shown). Specifically, the OLT 110 may act as an intermediary between the other network and the ONUs 121-124. For instance, the OLT 110 may forward data received from the network to the ONUs 121-124, and forward data received from the ONUs 121-124 onto the other network. Although the specific configuration of the OLT 110 may vary depending on the type of PON 100, in an embodiment, the OLT 110 may comprise a transmitter and a receiver. When the other network is using a protocol, such as Ethernet or synchronous optical network (SONET)/synchronous digital hierarchy (SDH) (SONET/SDH), that is different from the communications protocol used in the PON 100, the OLT 110 may comprise a converter that converts the other network's data into the PON's protocol. The OLT 110 converter may also convert the PON's data into the other network's protocol. The OLT 110 described herein is typically located at a central location, such as a central office, but may be located at other locations as well. In an embodiment, the OLT 110 may comprise a dual-rate or multi-rate receiver consistent with one or more of the embodiments disclosed herein. In other embodiments, the OLT 110 may comprise a first upstream receiver for receiving upstream communications at a nominal upstream rate, and a second upstream receiver for receiving upstream communications at a reduced upstream rate. In the same or other embodiments, the OLT 110 may comprise additional upstream receivers (e.g., a third receiver, a fourth receiver, etc.) for receiving upstream signals at different reduced upstream rates. In an embodiment, the OLT 110 may comprise one upstream receiver that is configured to receive upstream signals at only one data rate (e.g., the nominal data rate) and to implement a modified line code interpretation technique (e.g., interpreting "1111" as a '1', etc.) pursuant to one or more aspects discussed herein.

Another component of the PON 100 may be the ONUs 121-124. The ONUs 121-124 may be any devices that are configured to communicate with the OLT 110 and a customer or user (not shown). Specifically, each of the ONUs 121-124 may act as an intermediary between the OLT 110 and one or more customers. For instance, the ONUs 121-124 may forward data received from the OLT 110 to the customer, and forward data received from the customer onto the OLT 110. Although the specific configuration of the ONUs 121-124 may vary depending on the type of PON 100, in an embodiment, the ONUs 121-124 may comprise an optical transmitter configured to send optical signals to the OLT 110 and an optical receiver configured to receive signals from the OLT 110. In an embodiment, the optical receiver may convert the optical signals received from the OLT 110 into electrical signals for the customer, such as signals in the Asynchronous Transfer Mode (ATM) or Ethernet protocol. In an embodiment, the ONU's 121-124 optical receiver may comprise various circuitry and/or modules, such as a transceiver module, an amplification module, and a data and clock recovery module. In an embodiment, the ONUs 121-124 may concurrently receive the downstream optical signal (or more specifically, the optical signal transmitted in their assigned waveband/channel) at different effective data rates. For instance, ONU 121 may receive a first optical signal, e.g., associated with a first waveband/channel, at a nominal data rate, while ONU 122 may receive a second optical signal, e.g., associated with a second waveband/channel, at a reduced data rate. The ONUs 121-124 may also comprise a second transmitter and/or receiver that may send and/or receive the electrical signals to a customer device. In some embodiments, ONUs 121-124 and optical network terminals (ONTs) are similar, and thus the terms may be used interchangeably herein. The ONUs are typically located at distributed locations, such as the customer premises, but may be located at other locations as well.

Another component of the PON 100 may be the ODN 130. The ODN 130 is a data distribution system that may comprise optical fiber cables, couplers, splitters, distributors, and/or other equipment. In an embodiment, the optical fiber cables, couplers, splitters, distributors, and/or other equipment are passive optical components. Specifically, the optical fiber cables, couplers, splitters, distributors, and/or other equipment may be components that do not require any power to distribute data signals between the OLT 110 and the ONUs 121-124. The ODN 130 typically extends from the OLT 110 to the ONUs 121-124 in a branching configuration as shown in FIG. 1, but may be alternatively configured in any other configuration.

Figure 2:
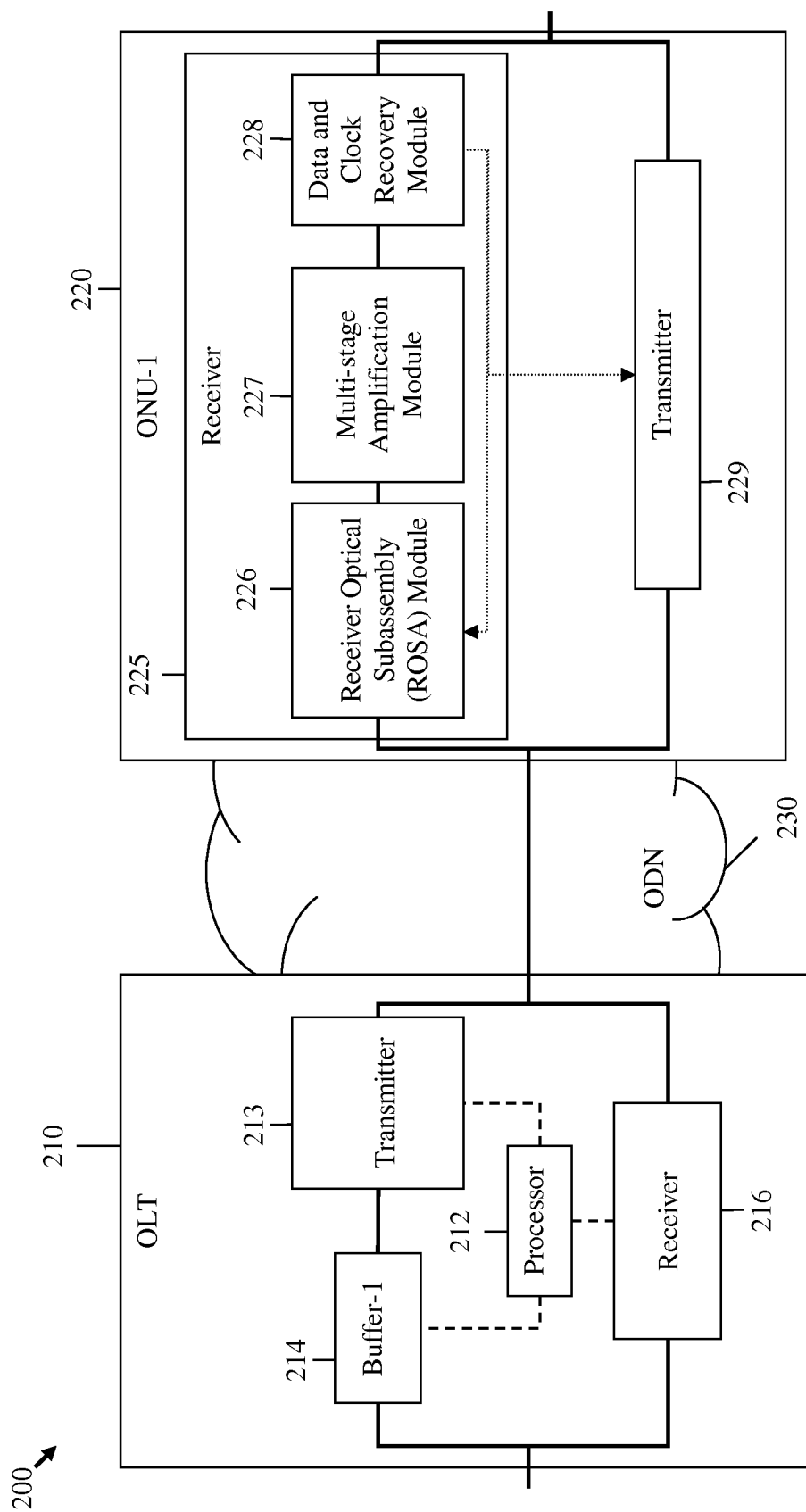
FIG. 2 is a schematic diagram of an embodiment of an ONU.

FIG. 2 illustrates an embodiment of a PON 200. The PON 200 may be configured similarly to the PON 100, and may comprise an OLT 210, an ONU-1 220, and an ODN 230. The OLT 210, the ONU 220, and the ODN 230 may be configured similarly to the OLT 11, the ONU 121, and the ODN 230, respectively. The OLT 210 may comprise a downstream transmitter 212, a processor 213, a first buffer (buffer-1) 214, and a receiver 216. The downstream transmitter 212 may be any device configured to transmit a downstream signal to the ONU-1 220. The processor 213 may comprise any device configured to manage transmitter 212 and the buffer-1 214, e.g., in a manner similar to that discussed in FIG. 9 infra. The buffer-1 214 may be any device configured to buffer data corresponding to the ONU-1 220. The receiver 216 may be any device configured to receive an upstream signal from the ONU-1 220. In an embodiment, the processor 213 may be configured to communicate with the ONU-1 220 via a PLOAM channel using the transmitter 212 and the receiver 216. The processor may also be able to gauge the amount of data (e.g., buffer lengths) in the buffer-1 214. The receiver 216 may be responsible for receiving upstream data from one or more ONUs (e.g., just the ONU-1 220 or, alternatively, the ONU-1 220 and several other ONUs). In an embodiment, the receiver 216 may be a multi-rate receiver and may be capable of receiving an upstream datastream from the ONU-1 220 at a plurality of upstream rates (e.g., 155 megabit per second (Mbps), 622 Mbps, etc.). In other embodiments, the receiver 216 may be a single rate receiver and may only be capable of receiving an upstream datastream at a single rate (e.g., only 155 Mbps). In an embodiment, the OLT 210 may comprise one or more additional single rate receivers configured to receive an upstream signal from the ONU-1 220 at a different rate (e.g., at 622 Mbps).

The ONU-1 220 may comprise an optical receiver 225 for receiving downstream signals from the OLT 210, and an optical transmitter 229 for transmitting upstream signals to the OLT 210. The optical receiver 225 may comprise a transceiver module 226, an amplification module 227, and a clock and data recovery module 228. Notably, the configuration of modules 226-228 is depicted herein for explanatory purposes, and those of ordinary skill in the art will recognize that the modules 226-228 may be arranged in various alternative configurations that may include additional intermediate processing components and/or omit/substitute/rearrange one or more of the modules 226-228. The modules 226-228 may interact with one another, as well as with other components within the ONU-1 220, to convert a downstream optical signal, e.g., transmitted in a corresponding downstream waveband, into an electrical signal, such as a radio frequency (RF) signal, that is suitable for customer premises equipment (CPE), e.g., routers, residential gateways (RGs), set-top boxes, and/or other telecommunications devices.

The receiver optical subassembly (ROSA) 226 may be any device configured to convert an optical signal into an RF signal. For instance, the ROSA 226 may comprise a dual-rate receiver, e.g., a dual rate transimpedance amplifier (TIA), a multi-rate receiver, e.g., a multi-rate TIA, or some other optoelectronic configuration, e.g., a diode coupled to a feedback amplifier. The amplification module 227 may be any device configured to amplify an electrical signal (e.g., an RF signal). In an embodiment, the amplification module 227 may comprise multiple stages of amplifiers, e.g., may be a multi-stage amplifier, where one or more of the stages may comprise a feedback amplifier. The clock and data recovery module 228 may be any device configured to perform clock extraction and/or data recovery operations, e.g., Ethernet layer error correction, etc., on the amplified RF signal. In an embodiment, the clock and data recovery module 228 may provide a clock signal (dotted line) to the ROSA 226 and or the optical transmitter 229, as well as various other components. The optical transmitter 229 may be any device configured to transmit an optical signal to the OLT, e.g., a distributed feedback laser (DFB), etc.

In some embodiments, the performance characteristics of the optical receiver 225 and or the optical transmitter 229 may vary depending on their power consumption. For instance, the ROSA 226, the amplification module 227, and/or the optical transmitter 229 may comprise a feedback amplifier whose power consumption is proportional (e.g., linearly, or otherwise) to the amplifier's frequency response (e.g., small signal frequency response). Specifically, the amplifier's frequency response may represent the amplifier's accuracy at various frequencies, and may determine the granularity with which the downstream signal can be sampled (e.g., may limit the effective data rate). Additionally or alternatively, the clock and data recovery module 228 may comprise digital circuitry capable of operating in a scaled voltage and frequency environment, e.g., a lower supply voltage may be used when operating at a lower frequency. Hence, the optical receiver 225 may be configured to operate at a lower data rate by lowering the supply power (e.g., supply voltage) of modules 226-228, thereby reducing the power consumption of the ONU-1 220. Similar measures may be taken to achieve power savings in the optical transmitter 229, which may further reduce the power consumption of the ONU-1 220.

In an embodiment, the ONU-1 220 may optionally receive the downstream optical signal at multiple data rates, such as a nominal data rate and/or one or more reduced data rates. The reduced data rate may be any data rate that is less than the nominal data rate, but typically may be some fraction (e.g., ¼, ½, or ¾) of the nominal data rate. In an embodiment, the ONU-1 220 may select its data rate by manipulating one or more components within the optical receiver 225 in accordance with a rate selection signal, e.g., a PLOAM message, received from an OLT. The rate selection signal, which is discussed in greater detail below, may specify the rate at which the ONU-1 220 receives the downstream signal, and may be based on an amount of data contained in buffers associated with the ONU's waveband. For instance, the rate selection signal may indicate that the ONU-1 220 should operate a reduced data rate that is ¼, ½, or ¾ of the nominal data rate depending on how much downstream data is being communicated in the waveband and/or channel assigned to the ONU-1 220.

In some PONs, ONUs may lock onto the downstream line rate by synchronizing and/or aligning the frequency and phase of internal clocks with the frequency and phase of the line rate (e.g., 2.5 Gbps in GPON). Consequently, the OLT may continue to transmit the downstream signal at the line rate (e.g., nominal data rate), even when some ONUs are operating in a reduced rate mode, so that ONUs operating in the normal operation mode can maintain synchronization. However, ONUs operating in the reduced rate mode may be incapable of interpreting the downstream signal at the nominal data rate due to their reduced frequency response. The OLT may accommodate ONUs operating in the reduced rate mode by adjusting the line coding for channels/wavebands assigned to those ONUs, thereby effectively reducing their data rate. For instance, the OLT may communicate with an ONU operating at a reduced data rate that is ¼ the nominal rate (e.g., 622 Mbps in GPON) by transmitting '1111' to indicate a logical one and '0000' to indicate a logical zero. In other embodiments, the effective data rate may be padded (e.g., zero padded) to allow alignment at the lower data rate. For instance, the OLT may communicate with an ONU operating at a reduced data rate that is ¹⁄₁₆ of the nominal rate (e.g., 625 Mbps in GPON) by transmitting a zero padded signal that comprises a '0111111111111110' (i.e., two 0's with fourteen 1's in between) to indicate a logical one or a '1000000000000001' (i.e., two 1's with fourteen 0's in between) to indicate a zero. Accordingly, the ONU may interpret the sequence '0111111111111110' as a one, and the sequence '1000000000000001' as a zero. Alternatively, the OLT may comprise two or more transmitters, each of which transmit at a different data rate. In an embodiment, the ONU's receiver sensitivity may be enhanced when operating at a lower data rate, and the OLT may achieve power savings by transmitting the downstream signal at a lower power level.

At this point, it may be helpful to briefly distinguish the term "data rate" from the term "line rate". In PONs, the downstream optical signal comprises a line rate (or gross bit rate) and a data rate (or net bit rate). The line rate may be the raw bit rate or uncoded transmission rate at which the downstream signal is transmitted, while the data rate may be the useful bit rate or coded transmission rate with which information is effectively communicated. For practical purposes, this disclosure will assume that the line rate is approximately equal to the nominal data rate (e.g., the maximum data rate), even though those of ordinary skill in the art will recognize that the line rate may be slightly larger than the nominal data rate due to physical layer protocol overhead (e.g., time-division multiplexing (TDM) framing bits, forward error correction (FEC) coding, and other physical layer channel coding). Hence (as used herein), the term "line rate" refers to the bit rate from the perspective of the OLT, and the term "data rate" to refers to the effective bit rate from the perspective of the ONU. Table 1 sets forth some basic line rates and data rates in a GPON embodiment for various operation modes. Notably, the downstream data rate for GPON is adjustable (e.g., from about 2.5 Gbps to about 1.25 Gbps), and the downstream data rates for other optical communications protocols may vary. Hence, the rates in table 1 are for explanatory purposes only, and should not be interpreted to limit the scope of this disclosure whatsoever.

TABLE 1

Line Rates and Data Rates for Selected Operation Modes in GPON

| Mode | Line Rate | Data Rate |
| --- | --- | --- |
| Normal Operation Mode (nominal) | 2.5 Gbps | 2.5 Gbps |
| Reduced Rate Mode (¾ nominal) | 2.5 Gbps | 1.875 Gbps |
| Reduced Rate Mode (½ nominal) | 2.5 Gbps | 1.25 Gbps |
| Reduced Rate Mode (¼ nominal) | 2.5 Gbps | 625 Mbps |

In an embodiment, an ONU operating in a reduced rate mode may achieve additional power savings by adopting power scaling on the transmitter side, e.g., operating at a lower upstream data rate by reducing supply voltage to one or more components in the transmitter module 229. Conventional ONUs may comprise laser transmitters that support variable data rate transmissions (e.g., from 155 Mbps to 2.5 Gbps) using a fixed/static power supply (i.e., the same supply voltage is used to generate all data rates), and therefore conventional ONUs may not realize a substantial reduction in power consumption by operating at a lower upstream data rate. That is to say, adjusting a conventional ONU's upstream transmission rate does not achieve substantial power savings. However, adjusting the ONU's upstream transmission rate according to techniques disclosed herein (e.g., power supply scaling, etc.) may allow for increased power savings. For instance, adjusting the ONU's upstream transmission rate by lowering the supply voltage to the upstream laser transmitter may cause the ONU to consume less power on the transmitter side, and thereby achieve the desired power savings. In such embodiments, the OLT may comprise dual-rate and/or multi-rate receivers, or, alternatively, the OLT may comprise single rate receivers that are configured to interpret line coding in the manner discussed above, e.g., the sequence "0111111111111110" and the sequence '1000000000000001' may be interpreted as a "one" or "zero" when the corresponding ONU is transmitting at a reduced data rate.

Figure 3:
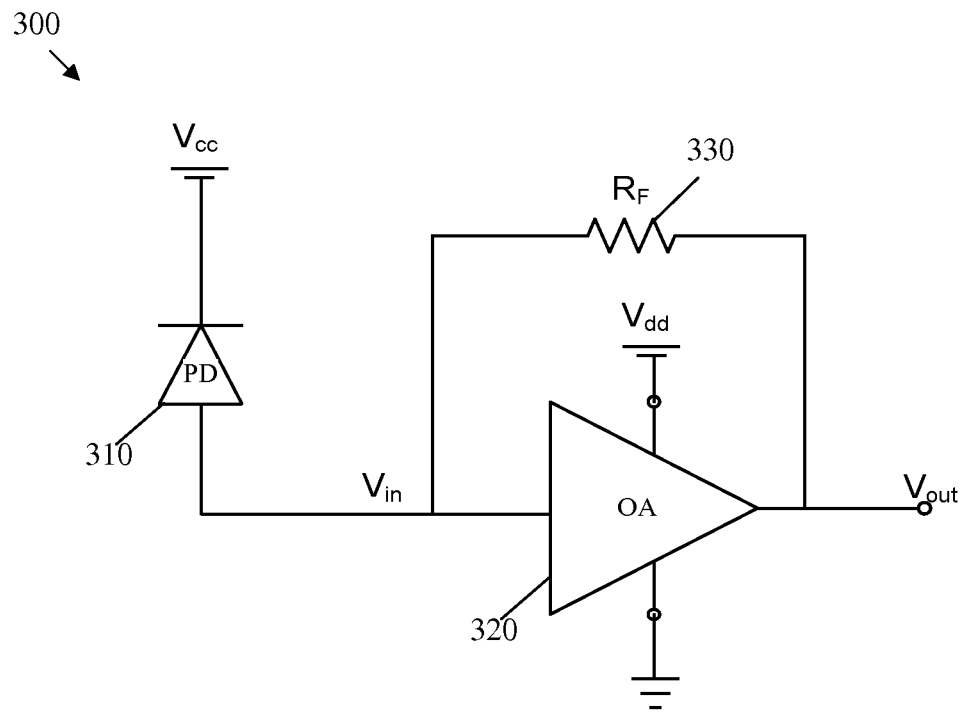
FIG. 3 is a schematic diagram of an embodiment of an amplifier.

FIG. 3 illustrates a ROSA 300, a variant of which may be implemented in the ROSA 226 of FIG. 2. The ROSA 300 may comprise a photodiode (PD) 310, an amplifier (AMP) 320, and a feedback resistor 330. The PD 310 may be any device used to convert an optical signal into an electrical signal. In an embodiment, the PD 310 may operate in a photoconductive (e.g., reverse biased) mode or a photovoltaic (e.g., zero biased) mode, and may produce an electrical signal whose current or voltage is proportional (e.g., linearly or otherwise) to one or more characteristics of the optical signal (e.g., the luminance and/or irradiance). In an embodiment, the ROSA 300 may be implemented in the amplification module 227. The AMP 320 may be any device that amplifies an input signal ($V_{in}$) to produce an output signal ($V_{out}$). The AMP 320 may comprise an amplification or gain characteristic (A) that is proportional to the ratio of $V_{out}$ to $V_{in}$, e.g., $A=V_{out}/V_{in}$. The AMP 320 may comprise a metal-oxide—semiconductor (MOS) transistor whose transconductance ($g_m$) is proportional to both the A of the AMP 320 and the feedback loop bias current ($I_b$), e.g., $A \propto g_m \propto I_b$. The feedback resistor 330 may be any component that provides electrical resistance in an electrical circuit, and may comprise a feedback resistance ($R_F$) that represents the resistance in the feedback loop.

The ROSA 300 may perform differently at different frequencies. For instance, the ROSA 300 may attenuate some frequencies and amplify others, a characteristic which may be represented as the frequency response of the ROSA 300. The frequency response of the ROSA 300 may have a pole or cutoff frequency ($F_C$) defined by the formula $$F_C = \frac{A}{R_F \times C_P},$$

where Cp is the equivalent capacitance at the input of the amplifier 320, including the capacitance of the PD 310 and other parasitic capacitance of the ROSA 300. Because the parameters A, $R_F$, or $C_P$ of the ROSA 300 are fixed, the $F_C$ of the ROSA 300 may be also be fixed.

Figure 4:
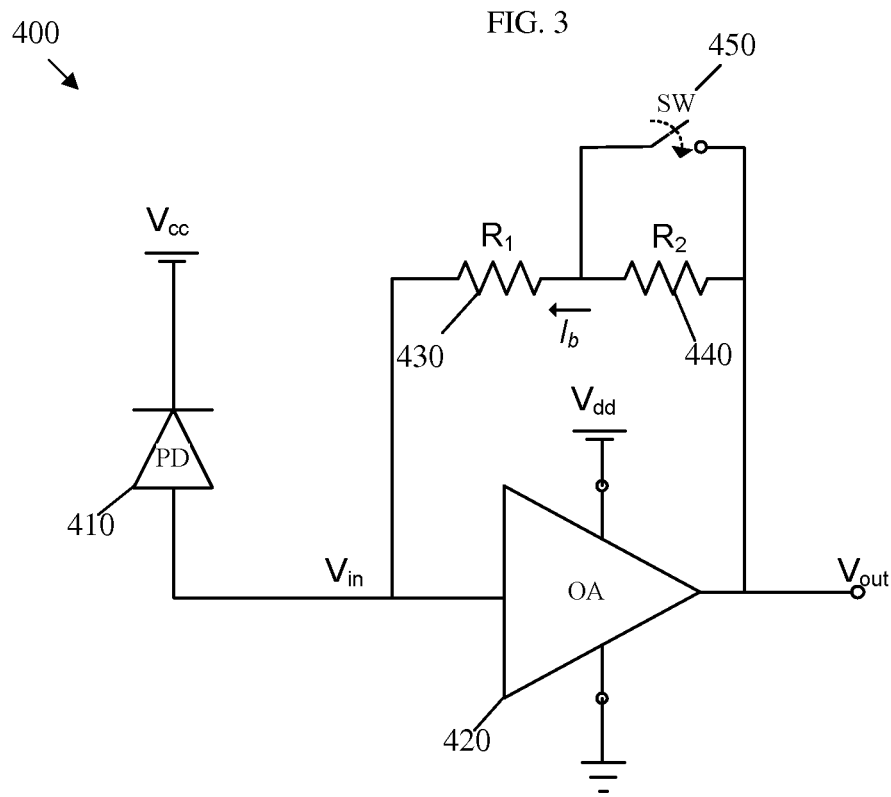
FIG. 4 is a schematic diagram of another embodiment of an amplifier.

FIG. 4 illustrates a dual-rate ROSA 400 which may be similar to the ROSA 300, except that the dual-rate ROSA 400 may be capable of adjusting the $R_F$ to reduce power consumption (as well as lower the $F_C$). The dual-rate ROSA 400 may comprise a PD 410, an AMP 420, a first feedback resistor 430, a second feedback resistor 440, and a switch (SW) 450. The PD 410 and the AMP 420 may be configured similarly to the PD 310 and the AMP 320 of the ROSA 300. The first feedback resistor 430 and the second feedback resistor 440 may be configured similar to the feedback resistor 330 except that the first feedback resistor 430 and the second feedback resistor 440 may correspond to a resistance ($R_1$) and a second resistance ($R_2$), respectively. The SW 450 may be any component capable of breaking (e.g., interrupting) an electrical circuit upon actuation or de-actuation (e.g., depending on whether SW 450 is normally open or normally closed). For instance, actuating SW 450 would break the electric circuit if SW 450 is normally closed, while de-actuating SW 450 will break the circuit if SW 450 is normally open. Throughout this disclosure, SW 450 will be described as a "normally closed" single-pole single-throw (SPST) electromechanical switch, although those of ordinary skill in the art will recognize that the SW 450 may comprise various alternative electromechanical switching configurations (e.g., double throw, dual-pole, etc.) or electronic switching configurations (e.g., semiconductor devices, such as a solid state relay, etc.).

The first feedback resistor 430, the second feedback resistor 440, and the SW 450 may be arranged such that the SW 450 can be actuated/de-actuated to manipulate the $R_F$ of the dual-rate ROSA 400. For instance, the second feedback resistor 440 may be connected in series with the first feedback resistor 430, but in parallel with the SW 450, such that the SW 450 acts as an optional short to bypass the second feedback resistor 440. That is to say, the SW 450 can be actuated to increase the $R_F$ ($R_F=R_1+R_2$), and de-actuated to decrease the $R_F$ ($R_F=R_1$).

Increasing the $R_F$ of the dual-rate ROSA 400 may lower the $F_C$ and reduce the power consumption of the dual-rate TIA 400. Specifically, the $F_C$ may be inversely proportional to $R_F$ $$\left(F_C = \frac{A}{R_F \times C_P}, \therefore F_C \propto 1/R_F\right).$$

Additionally, the power ($P_c$) consumed by the dual-rate TIA 400 may be proportional (e.g., linearly, or otherwise) to the bias current ($I_b$) of the feedback loop ($P_c \propto I_b$), which may be inversely proportional to the $R_F$ $$\left(I_b = \frac{V_{out}}{R_F} \therefore I_b \propto \frac{1}{R_F}\right),$$

and therefore the $P_c$ may be inversely proportional to the $R_F$ $$\left(P_c \propto I_b \propto \frac{1}{R_F}\right).$$

As such, the SW 450 may be actuated/opened, e.g., according to a rate selection signal, to raise the $R_F$, thereby lowering the $F_C$ and reducing the $P_c$ of the dual-rate TIA 400.

Figure 5:
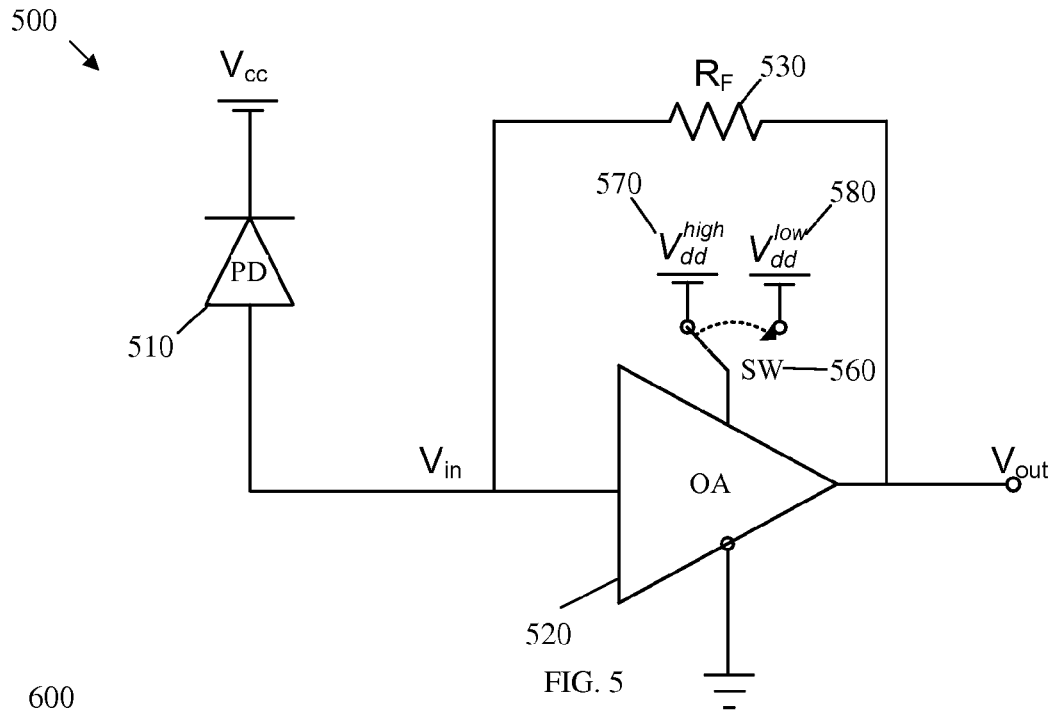
FIG. 5 is a schematic diagram of another embodiment of an amplifier.

FIG. 5 illustrates a dual-rate TIA 500 which may be similar to the ROSA 400, except that the ROSA 500 adjusts the supply voltage (e.g., from $V^{high}$ to $V^{low}$, or vice versa), rather than manipulating the $R_F$, to manipulate the $F_C$ and $P_c$. The dual-rate ROSA 500 may comprise a PD 510, an AMP 520, a feedback resistor 530, an SW 560, a first supply voltage 570, and a second supply voltage 580. The PD 510, the AMP 520, and the feedback resistor 530 may be configured similarly to the PD 310, the AMP 320, and the feedback resistor 330. The SW 560 is depicted as a conventional single-pole double-throw (SPDT) electromechanical switch, although those of ordinary skill in the art will recognize that the SW 560 may comprise various alternative configurations, e.g., any component configured to switch between two circuit connections. The first supply voltage 570 and the second supply voltage 580 may be any device that supplies voltage direct current (DC), e.g., a battery, a DC signal from the customer-premises/OLT, etc. In an embodiment, the first supply voltage 570 and the second voltage supply 580 may correspond to a high voltage ($V^{high}$) and a low voltage ($V^{low}$), respectively, where $V^{high} > V^{low}$.

In an embodiment the SW 560, the first supply voltage 570, and the second supply voltage 580 may be configured to manipulate the supply voltage of the AMP 520 through actuation of the SW 560. For instance, the SW 560 may be configured to optionally connect a lead of the AMP 520 to the first supply voltage 570 or the second supply voltage 580 depending on whether the SW 560 is actuated/de-actuated. Further, the $P_c$ of the dual-rate TIA 500 may be proportional to the selected supply voltage ($P_c \propto V^{high/low}$), such that $P_c$ is greater when the SW 560 is switched to $V^{high}$ than when the SW 560 is switched to $V^{low}$. Additionally, the A of the AMP 520 may be proportional to the supply voltage 570 or 580 ($A \propto V^{high/low}$) such that A is greater when the SW 560 is switched to $V^{high}$ than when the SW 560 is switched to $V^{low}$. Furthermore, $F_C$ is proportional to the A of the AMP 520

$$\left( F_C = \frac{A}{R_F \times C_P}; \therefore F_c \propto A \right),$$

therefore a reduction in the supply voltage (e.g., from $V^{high}$ to $V^{low}$) may cause a corresponding reduction in the $F_C$ and the $P_c$ of the dual-rate TIA 500. As such, the SW 560 may be actuated/de-actuated (e.g., according to a rate selection signal) to adjust the A of the AMP 520, thereby lowering the $F_C$ and reducing the $P_c$ of the dual-rate ROSA 500.

Figure 6:
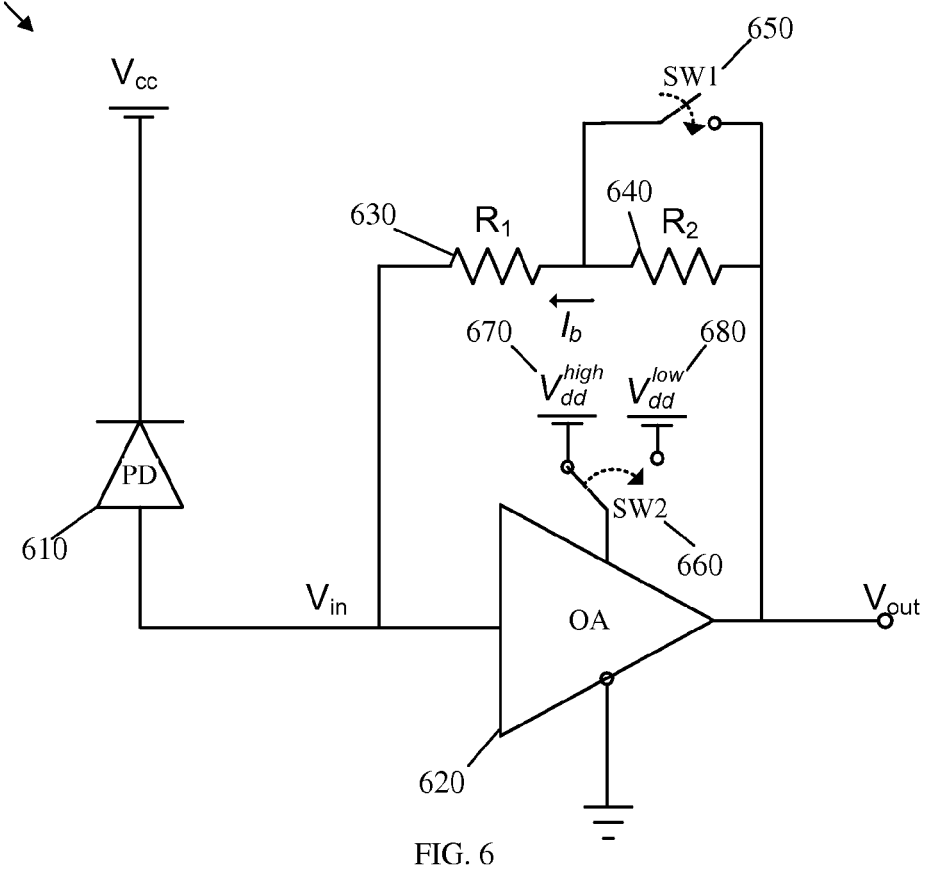
FIG. 6 is a schematic diagram of another embodiment of an amplifier

FIG. 6 describes a multi-rate ROSA 600 that is configured to adjust the supply voltage (e.g., from $V^{high}$ to $V^{low}$, or vice-versa) and the $R_F$ to manipulate its $F_C$ and $P_C$ characteristics. The multi-rate ROSA 600 may comprise a PD 610, an AMP 620, a first feedback resistor 630, a second feedback resistor 640, a first SW (SW1) 650, a second SW (SW2) 660, a first supply voltage 670, and a second supply voltage 680, which may be configured similarly to the PD 310, the AMP 320, the first feedback resistor 430, the second feedback resistor 440, the SW 450, the SW 560, the first supply voltage 570, and the second supply voltage 580 as discussed above. The multi-rate TIA 600 may actuate/de-actuate the SW1 650 and/or SW2 660 to adjust the $R_F$ and the supply voltage, respectively, thereby manipulating the $F_C$ and $P_C$, respectively. Specifically, the lowest setting on the multi-rate ROSA 600, e.g., with the SW1 650 closed and the SW2 660 set to $V^{low}$) may achieve greater power savings than any setting of the dual-rate ROSA 400 or the dual-rate ROSA 500. Additionally, the multi-rate TIA 600 may comprise multiple intermediate settings that allow different reduced data rates to be achieved, e.g., ¼, ½, and ¾ of the nominal. For instance, the SW1 650 may be open and the SW2 may be set to $V^{high}$ to achieve a highest data rate (e.g., a nominal data rate); the SW1 650 may be closed and the SW2 660 may be set to $V^{high}$ to achieve a first intermediate data rate (e.g., equal to about ¾ or about ½ of the nominal data rate); the SW1 650 may be open and the SW2 may be set to $V^{low}$ to achieve a second intermediate data rate (e.g., equal to about ¾ or about ½ of the nominal data rate); and the SW1 650 may be closed and the SW2 may be set to $V^{low}$ to achieve a low data rate (e.g., ¼ the nominal data rate). As recognizable to those of skill in the art, the values $R_1$, $R_2$, $V^{high}$, and $V^{low}$ corresponding to the first feedback resistor 630, the second feedback resistor 640, the first supply voltage 670, and the second supply voltage 680 (respectively) may be chosen to achieve different data rates and or power savings, e.g., to achieve various $F_C$ and $P_c$ characteristics, depending on network objectives.

Figure 7:
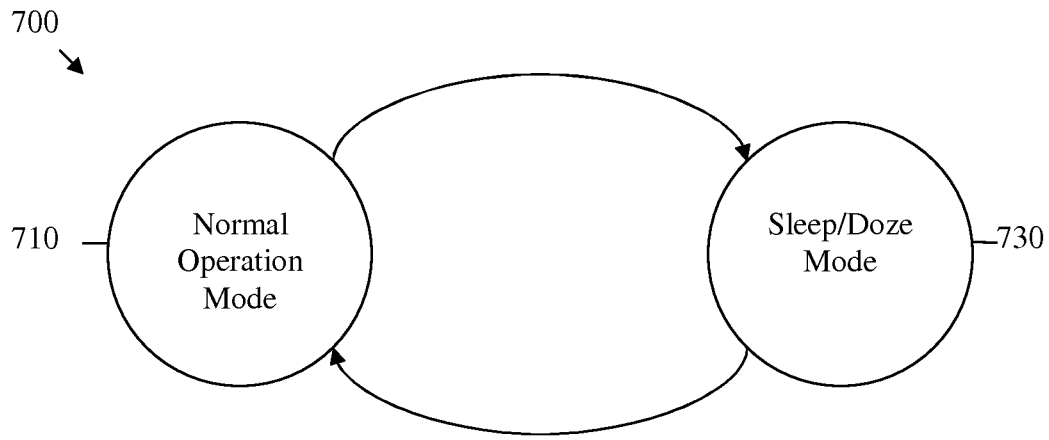
FIG. 7 is a state diagram of the operational modes of an ONU according to the prior art.

FIG. 7 illustrates the prior art method for reducing power consumption in an ONU 700. The method 700 may comprise alternating between two modes; a normal mode 710 and a sleep/doze mode 730. In the normal mode 710, the ONU may send and receive data at the nominal data rate (e.g., 1 Gbps in EPON). In the sleep/doze mode 730, the ONU may substantially power down or turn off its reception and/or transmission components, and be incapable of sending data to or receiving data from the OLT. Upon entering the sleep/doze mode 730, the ONU may periodically re-enter the normal operation mode 710 (e.g., wake-up) to check if the OLT has any data to send. For instance, ONUs may be configured to wake-up from the sleep/doze mode 730 every ten seconds, one second, etc. ONUs that wake up too often may achieve less significant power savings, while ONUs that wake up too seldom may experience a degradation in service quality (e.g., due to increased latency, etc.). Further, the ONU may be required to re-synchronize with the OLT upon waking up, e.g., by re-aligning its frequency/phase with a clock in the downstream data signal. Hence the ONU may experience additional latency or delays (e.g., of 300 ms or more) upon transitioning from the sleep/doze mode 730 to the normal operation mode 710, which may further reduce service quality.

Figure 8:
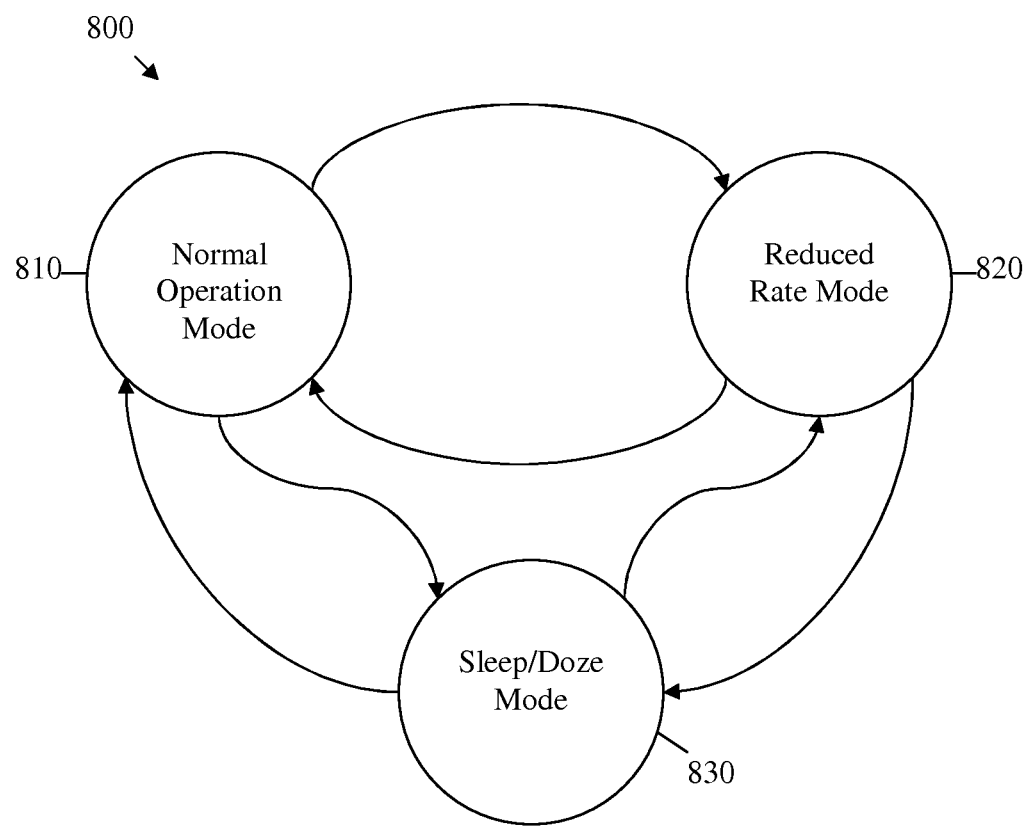
FIG. 8 is a state diagram of the operational modes of an ONU according to one or more embodiments of this disclosure.

FIG. 8 illustrates an improved method for reducing power consumption in an ONU 800. The method 800 may comprise alternating between three modes; a normal mode 810, a reduced rate mode 820, and a sleep/doze mode 830. In an embodiment, the normal mode 810 and the sleep/doze mode 830 may be substantially similar to the normal mode 710 and the sleep/doze mode 730, while the reduced rate mode 820 may allow the ONU to receive downstream data from the OLT at a reduced rate, e.g., ¼, ½ or ¾ the nominal rate.

In an embodiment, the ONU may begin in the normal operation mode 810, although the ONU may begin in the reduced rate mode 820 or the sleep/doze mode 830 in alternative embodiments. While in the normal operation mode 810, the ONU may receive a rate selection signal (e.g., a PLOAM message) indicating a reduced rate mode when the OLT has less data to send. Responsive to receiving the rate selection signal indicating the reduced rate mode, the ONU may transition from the normal operation mode 810 to the reduced rate mode 820, where the ONU may begin receiving downstream data at a reduced data rate. In an embodiment, the reduced data rate may be a preconfigured data rate, or may be specified by the rate selection signal. While in the reduced rate mode 820, the ONU may reduce the power consumption by implementing one or more of the power saving measures discussed above. In some embodiments, the ONU may enter the reduced rate mode 820 upon detecting a low data condition in the ONU's assigned message, e.g., instead of upon being prompted by the OLT.

Once in the reduced rate mode 820, the ONU may receive a second rate selection signal. In an embodiment, the second rate selection signal may indicate a normal data rate when the OLT has more data to send, in which case the ONU may transition back to the normal operation mode 810 and resume receiving data at the nominal data rate. While in the reduced rate mode 820, the ONU may maintain synchronization with the OLT, e.g., by aligning its frequency/phase with a clock in the downstream data signal. Hence, the OLT may avoid the delays associated with re-synchronization upon re-entry into the normal operation mode 810. Alternatively, the second rate selection signal may comprise an adjusted reduced rate that indicates an adjustment to the reduced rate, in which case the ONU may remain in the reduced rate mode 820 and begin receiving data at the adjusted reduced rate. In some embodiments the ONU may optionally power down its upstream transmitter while in the normal mode 810 or the reduced rate 820 to achieve additional power savings.

Alternatively, the second rate selection signal may indicate entry into the sleep/doze mode 830, at which time the ONU may transition from the reduced rate mode 820 to the sleep/doze mode 830. Although the sleep/doze mode 830 is depicted herein, those of ordinary skill will recognize that the sleep/doze mode 830 may be omitted in some implementations, e.g., when offline service modes are undesirable or when service quality is at a premium. Alternatively, the ONU may transition from the reduced rate mode 820 to the sleep/doze mode 830 upon detecting a network condition (e.g., an idle period where no data has been transmitted/received to/from the ONU for some time), rather than upon prompting from the OLT. While in the sleep/doze mode 830, the ONU may periodically wake up to see if the OLT has any data to send. When waking up, the ONU may enter the normal operation mode 810 or the reduced rate mode 820.

As indicated above, the OLT may dictate when the ONU enters the normal operation mode 810, the reduced rate mode 820, and/or the sleep/doze mode 830. In an embodiment, the OLT may specify when the ONU should transition from the normal mode 810 to the reduced data rate 820 (or vice versa) by sending a PLOAM message in the PLOAM channel, while the ONU may transition from the reduced rate mode 820 to the sleep/doze mode 830 independently or without prompting from the OLT, e.g., upon detecting an idle period of a certain length. Additionally, the ONU may enter any of the normal operation mode 810, the reduced rate mode 820, or the sleep/doze mode 830 upon either detecting a network condition or being prompted by the OLT, e.g., whichever occurs first. In some embodiments, the ONU may enter the sleep/doze mode 830 from the normal mode 810 and/or enter the reduced rate mode 820 from the sleep/doze mode 830.

Figure 9:
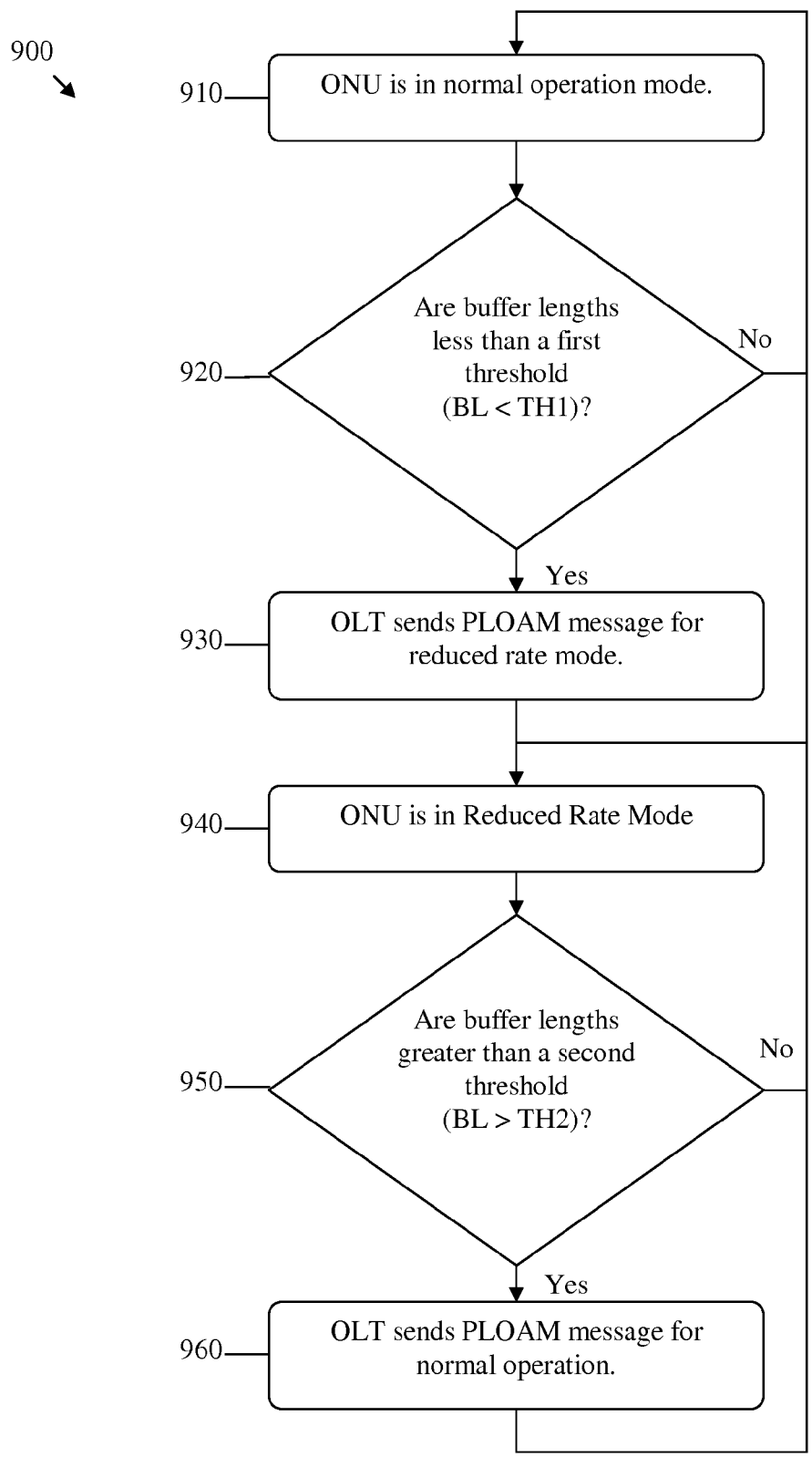
FIG. 9 is a flow chart of a method for determining entry-into/emergence-from a reduced rate operational mode 900.

FIG. 9 illustrates a method for determining entry-into/emergence-from a reduced rate operational mode 900. Specifically, an OLT may implement the method 900 to identify when it is appropriate to prompt the ONU to enter into or emerge from a reduced rate mode. At step 910, the ONU may be in a normal operation mode and may be receiving a downstream optical signal at a nominal data rate. In an embodiment, the downstream optical signal may comprise one or more traffic containers (T-CONTs) that are assigned/allocated to the ONU. At step 920, the OLT may determine whether one or more buffer lengths (BLs) associated with those T-CONTs are less than a first threshold (TH1), e.g., are BLs<TH1. The BLs associated with the T-CONTs may correspond to the amount of data stored in one or more buffers serviced by the T-CONTs, and hence may be indicative of a volume or quantity of data that is currently being, or soon will be, transmitted to the ONU via a corresponding waveband/channel in the downstream optical signal. In other words, high buffer lengths associated with the T-CONTs may indicate that the OLT currently has (or will have) more data to send to the ONU, while low buffer lengths associated with the T-CONTS may indicate that the OLT currently has (or will have) less data to send to the ONU. The TH1 may correspond to the minimum amount of data that warrants transmission at a nominal data rate.

If BL≥TH1, then the method 900 may revert back to step 910 such that the ONU may remain in the normal operation mode and continue to receive the downstream data the nominal data rate. If BL<TH1, then the method 900 may proceed to step 930, where the OLT may send a PLOAM message to the ONU indicating a reduced rate mode. In an embodiment, the first threshold may comprise a plurality of secondary thresholds associated with various reduced data rates (e.g., ¼, ½, or ¾ the nominal rate). For instance, the first threshold may comprise a first secondary threshold ($TH1_1$), a second secondary threshold ($TH1_2$), and a third threshold ($TH1_3$), where $TH1_1 < TH1_2 < TH1_3$. For instance, the reduced data rate may be determined as follows: (1) If $BL < TH1_1$, then reduced data rate is set to ¼ of nominal data rate; (2) If $TH1_1 \leq BL < TH1_2$, then the reduced data rate is set to ½ of the nominal data rate; (3) if $TH1_2 \leq BL < TH1_3$, then the reduced data rate is set to ¾ of the nominal data rate; and (4) if $TH1_3 \leq BL$, then the ONU continues receiving the downstream optical signal at the nominal data rate.

Pursuant to receiving the PLOAM message sent in step 930, the ONU may transition from a normal operation mode to the reduced data rate mode. Next, the method may proceed to step 940, where the ONU may begin receiving the downstream optical signal at the reduced data rate. After some period, the method may proceed to step 950, where the OLT may re-evaluate the ONU's reduced rate mode and/or the ONU's reduced data rate. For instance, the OLT may determine whether the BLs associated with the T-CONTs are greater than a second threshold (TH2), e.g., are BLs>TH2. If so (e.g., if BLs>TH2), then the method 900 may proceed to step 960. At step 960, the OLT may send a PLOAM message to the ONU instructing the ONU to transition back to the normal operation mode, at which time the ONU may resume receiving data at the nominal data rate (i.e., step 910). Otherwise (e.g., if BLs≤TH2), then the method 900 may proceed back to step 940 and the ONU may continue receiving data at the reduced data rate.

In some embodiments, the third threshold may comprise a plurality of secondary thresholds (e.g., $TH2_1$, $TH2_2$, $TH2_3$) associated with various data rates, and the OLT may re-adjust the reduced data rate according to the determination made in step 950. For instance, (1) If $BL \leq TH2_1$, then the reduced data rate may be adjusted to (or maintained at) ¼ of nominal data rate; (2) If $TH2_1 < BL \leq TH2_2$, then the reduced data rate may be adjusted to (or maintained at) ½ of the nominal data rate; (3) if $TH2_2 < BL \leq TH2_3$, then the reduced data rate may be adjusted to (or maintained at) ¾ of the nominal data rate; and (4) if $TH2_3 < BL$, then the ONU may be instructed to transition back to the normal operation mode, where the ONU may resume receiving the downstream optical signal at the nominal data rate.

In an embodiment, one or more of the thresholds, e.g., TH1 and TH2, may be approximately equal, e.g., TH1≈TH2. Alternatively, TH1 and TH2 may be different (e.g., TH1<TH2), such that a cushion or dampener exists between transitional thresholds. For instance, when TH1 is less than TH2 (e.g., TH1>TH2), the method 900 may avoid multiple successive transitions (e.g., entry into the reduced rate mode followed shortly or immediately by an emergence from the reduced rate mode, or vice-versa) due to normal fluctuations in the BLs. The same principals may be applied when selecting one or more of the secondary thresholds.

The method 900 may be continuously executed by the OLT, e.g., during all periods of operation, or periodically executed by the OLT, e.g., during periods where low data communication is more likely, such as between midnight and dawn. Additionally, the OLT may execute the method 900, or one or more steps of the method 900, according to a schedule, e.g., once every 100 ms, etc). Additionally, the method 900 may comprise one or more built in delays between one or more of the steps 910-960. For instance, there may exist a first delay (D1) between step 910 and step 920 and/or a second delay (D2) between step 940 and 950 so that a processing capacity of the OLT is not exhausted or wasted through repetitiously monitoring the conditions (e.g., is BL<TH1 or BL>TH2). Other built in delays may exist between other pairs of successive steps (e.g., 920 and 930) or non-successive steps (e.g., 920 and 950).

FIG. 10(a) illustrates a standard PLOAM message 1010 that may be sent from the OLT to an ONU that is in a normal operation mode. The standard PLOAM message 1010 may comprise an ONU identification (ID) field 1013, a Message ID (MID) field 1014, a data field 1015, and a Cyclical Redundancy Check (CRC) field 1016, each of which may exhibit similar functionality to those described in ITU-T G.984.3. In an embodiment, the total length of the PLOAM message 1010 may comprise about 104 bits or about 13 octets.

The ONU ID field 1013 may comprise an about eight bit or one octet value that specifies an ONU or group of ONUs for which the PLOAM message 1010 is intended/addressed. In an embodiment, the ONU ID field 1013 may comprise a value between about zero and about 253 (e.g., 0, 1, . . . , 253) and may indicate that the PLOAM message 1010 is intended for a specific ONU or group of ONUs that corresponds to that value. The MID field 1014 may comprise an about eight bit or one octet value that specifies a type associated with the PLOAM message 1010. In an embodiment, an MID field 1014 comprising a value of about 255 (e.g., set to FF or 0xFF) may indicate that the PLOAM message 1010 is associated with a reduced rate message type. The data field 1015 may comprise an about 80 bit or ten octet value that specifies the data portion of the PLOAM message 1010. The CRC field 1016 may comprise error correction information (e.g., a frame check sequence, etc.).

FIG. 10(b) illustrates an embodiment of a PLOAM message 1020 that may be sent to an ONU operating in a normal operation mode to indicate a transition to a reduced rate mode, e.g., to instruct the ONU to enter the reduced rate mode. The PLOAM message 1020 may comprise a broadcast message indication (BMI) field 1021, a reduced rate mode (RRM) type field 1022, an ONU ID field 1023, a rate indicator (RI) field 1024, a data field 1025, and a CRC field 1026. The ONU ID field 1023, data field 1025, and CRC field 1026 may be configured similarly to the ONU ID field 1013, the data field 1015, and the CRC field 1016 as described above, although the data field 1025 may comprise two fewer octets than the data field 1015 (e.g., about 64 bits or about eight octets, rather than about 80 bits or about ten octets) to accommodate for one or more additional fields within the PLOAM message 1020. Such accommodation may allow the total length of the PLOAM message 1020 to comprise about 104 bits or about 13 octets, such that the PLOAM message 1020 comprises about the same length as the standard PLOAM message 1010.

The BMI field 1021 may comprise an about eight bit or one octet value that indicates that the PLOAM message 1020 is a broadcast message (e.g., a PLOAM message intended for all ONUs). In an embodiment, the BMI field 1021 may be configured similarly to the ONU ID field 1013 as depicted in FIG. 10(a), except that the BMI field 1021 may be set equal to about 255 (e.g., FF or 0xFF) to indicate that the PLOAM message 1020 is a broadcast message intended for all ONUs, while the ONU ID field 1013 may be set to a different value (e.g., 0, 1, . . . , 253) to indicate that the PLOAM message 1010 is intended for a specific ONU corresponding to said value. In such an embodiment, the BMI field 1021 may be considered to be an ONU ID field 1013 that is set to FF, as is consistent with ITU-T G.984.3.

The RRM type field 1022 may comprise an about eight bit or about one octet value that indicates that the PLOAM message 1020 is a reduced rate mode type message. In an embodiment, the RRM type field 1022 may be configured similarly to the MID field 1014 of the PLOAM message 1010, except that the RRM type field 1022 may be set equal to about 255 (e.g., FF or 0xFF) to indicate that the PLOAM message 1020 comprises a reduced rate mode type message, while the MID field 1014 may be set to some other value, e.g., such as one of the values defined in ITU-T G.983.4, to indicate that the PLOAM message 1010 is some other message type. In such an embodiment, the RRM type field 1022 may be considered to be an MID field 1014 that is set to FF.

The RI field 1024 may comprise an about eight bit or about one octet value that indicates a reduced rate for the PLOAM message 1020. For instance, the RI field 1024 may comprise an RI value of about zero (e.g., 0x00 or 00) to indicate a nominal data rate, an RI value of about 70 (e.g., 0x0F or 0F) to indicate a reduced data rate equal to about ½ the nominal data rate, and an RI value of about 270 (e.g., 0XF0 or F0) to indicate a reduced data rate equal to about ¼ the nominal rate. Those of ordinary skill in the art will recognize that the RI field 1024 may be configured according to various different value-rate associations, e.g., a value of 00 may indicate a nominal rate, a value of 0F may indicate a reduced rate of ¾ the nominal rate, a value of F0 may indicate a reduced rate of ½ the nominal rate, and a value of FF may indicate a reduced rate of about ¼ the nominal rate, etc.

FIG. 10(c) illustrates an embodiment of a PLOAM message 1030 that may be sent to an ONU operating at a reduced data rate equal to about ½ the nominal rate. Specifically, the PLOAM message 1030 may indicate a transition back to the normal operation mode (e.g., to indicate that the ONU should exit the reduced rate mode), or may indicate a transition from a first reduced rate (e.g., ½ the nominal rate) to a second reduced rate (e.g., ¼ the reduced rate). The PLOAM message 1030 may comprise a first field 1031, an ONU ID field 1033, an RI field 1034, a data field 1035, and a CRC field 1036. The first field 1031 may comprise about four octets, and may be set to about 'FF FF'. The ONU ID field 1033 and the CRC field 1036 may be configured similarly to the ONU ID field 1023 and the CRC field 1026 (respectively), except that the lengths of the ONU ID field 1033 and the CRC field 1036 may be adjusted for a reduced data rate equal to about ½ the nominal rate. For instance, the ONU ID field 1033 and the CRC field 1036 may each comprise about two octets (rather than one octet) to allow for the appropriate line coding. The data field 1035 may be configured similar to the data field 1025, except that the length of the data field 1035 may be reduced accordingly such that the PLOAM message 1030 may comprise a total length of about 13 octets. In an embodiment, the RI field 1034 may be maintained at about one octet irrespective of the reduced data rate.

The first field 1031 (e.g., set to about 'FF FF') may be interpreted as 'FF' by ONUs operating at a reduced rate equal to about ½ the nominal rate. As such, the first field 1031 may indicate to those ONUs that the PLOAM message 1030 is a broadcast message (e.g., has a BMI field 1021 set to about 'FF'). In an embodiment, the ONUs operating in a ½ rate mode may be configured to assume all messages they interpret to be broadcast messages (e.g. having first two octets set to 'FF FF') are reduced rate messages. In an embodiment, the line coding of the ONU ID 1033, the data field 1035, and the CRC field 1036 may be adjusted appropriately for ONUs operating at a reduced rate equal to about ½ the nominal rate. Specifically, the ONU ID field 1033 may be line coded such that two PLOAM message 1030 bits are used for each actual bit of information (e.g., a 2:1 ratio of coded-bits to information-bits). For instance, if the PLOAM message 1030 is intended for an ONU associated with an actual ONU ID of about '0101 0101', then the ONU ID 1033 may be set to about '0011 0011 0011 0011'. Similar line coding may be applied to the data field 1035 and the CRC field 1036.

In an embodiment, an ONU operating at a reduced rate that is about ½ the nominal rate may be configured to interpret the eight bit RI field 1034 as a four bit RI value such that the line coding for the RI field 1034 does not need to be altered. For instance, the ONU may be configured such that: an RI field 1034 set to about '0000 0000' (e.g., 0x00) may be interpreted by the ONU as an RI value of about '0000'; an RI field 1034 set to about '0000 1111' (e.g., 0x0F) may be interpreted by the ONU as an RI value of about '0011'; and an RI field 1034 set to about '1111 0000' may be interpreted by the ONU as an RI value of about '1100'. Consequently, ONUs operating at a reduced rate mode equal to about ½ the nominal rate may be configured as follows: responsive to an RI value of about '0000' (e.g., corresponding to an RI field 1034 set to about 0x00), transitioning back to the normal operation mode such that downstream data is received at the nominal data rate; responsive to an RI value of about '0011' (e.g., corresponding to an RI field 1034 set to about 0X0F), maintaining a reduced data rate equal to about ½ the nominal rate; responsive to an RI value of about '1100' (e.g., corresponding to an RI field 1034 set to about 0XF0), transitioning to a reduced data rate equal to about ¼ the nominal rate. In some embodiments, the PLOAM 1030 may only be sent to indicate a transition away from the reduced data rate equal to about ½ the nominal data rate, and hence may comprise an RI field 1034 that is set to about '0000 1111' (e.g., 0X0F). In other embodiments, the PLOAM 1030 may be sent periodically (e.g., regardless of whether a rate change is necessary) so as to prevent a time-out by the ONU, which may occur (in some but embodiments) when an ONU is configured to transition back to the normal rate when a reduced rate instruction/indication is not been received within a predetermined period of time. In such embodiments, the PLOAM 1030 comprising an RI field 1034 set to about '0000 1111' (e.g., 0x0F) may be sent periodically to the ONU to indicate that the ONU should maintain a reduced data rate equal to about ½ the nominal data rate.

Notably, ONUs operating at the nominal data rate may be configured to discard the PLOAM message 1030 upon interpreting the first field 1031. Specifically, ONUs operating at the nominal data rate may interpret the first three octets of the first field 1031 (e.g., set to 'FF FF FF') as follows: the first octet (FF) indicates that the PLOAM message 1030 is a broadcast message (e.g., a BMI field 1021 set to 'FF'); the second octet 'FF' indicates that the PLOAM message 1030 comprises a rate reduction type message (e.g., an RRM type 1022 set to 'FF'); and third octet specifies an ONU ID of 'FF' (e.g., an ONU ID 1023 set to 'FF'). Typically, ONUs may be configured to discard any PLOAM message that does not specify their associated/assigned ONU ID. As such, all ONUs operating at the nominal data rate may discard the PLOAM 1030 because the ONU ID of 'FF' is not assigned to any ONU, e.g. the ONU ID of 'FF' may be reserved in ITU-T G.984.3, and therefore may not be assigned to any ONU.

FIG. 10(*d*) illustrates an embodiment of a PLOAM message 1040 that may be sent to an ONUs operating at a reduced rate equal to about ¼ the nominal data rate. Specifically, the PLOAM message 1040 may indicate a transition back to a normal operation mode (e.g., that the ONU should exit the reduced rate mode) or a transition from a first reduced rate (e.g., ¼ the nominal rate) to a second reduced rate (e.g., ½ the reduced rate). The PLOAM message 1040 may comprise a first field 1041, an ONU ID field 1043, an RI field 1044, and a CRC field 1046. The first field 1041, the ONU ID field 1043, and the CRC field 1044 may be configured somewhat similarly to the first field 1031, the ONU ID field 1033, and the CRC field 1036, respectively, except that the first field 1041, the ONU ID field 1043, and the CRC field 1044 may each comprise about four octets (e.g., rather than about two octets) to adjust for a reduced data rate equal to about ¼ the nominal data rate. Specifically, the first field 1041 may be set equal to about 'FFFF FFFF' (e.g., 0xFFFF), which may interpreted as 'FF' by an ONU operating at a reduce data rate equal to about ¼ the nominal rate. As such, the first field 1041 may indicate to ONUs operating at about ¼ the nominal data rate that the PLOAM 1040 is a broadcast message (e.g., BMI field 1021 equal to 'FF'). Similar to their counterparts (e.g., ONUs operating at a reduced data rate equal to about ½ the nominal data rate), ONUs operating at a reduced data rate equal to about ¼ the nominal data rate may assume all broadcast messages (i.e. messages they interpret to be broadcast messages) comprise a reduced rate message type.

In an embodiment, the line coding of the ONU ID 1044 and the CRC field 1046 may be adjusted a reduced data rate equal to about ¼ the nominal rate. Specifically, the ONU ID field 1044 may be line coded such that four PLOAM message 1040 bits are used for every one actual bit of information. For instance, if the PLOAM message 1040 is intended for an ONU associated with an actual ONU ID of about '0101 0101', then the ONU ID 1043 may be set to about '0000 1111 0000 1111'.

In an embodiment, an ONU operating at a reduced rate equal to about ¼ the nominal rate may be configured to interpret the eight bit RI field 1044 as a two bit RI value such that the line coding for the RI field 1044 does not need to be altered. For instance, the ONU may be configured such that: an RI field 1044 set to '0000 0000' (e.g., 0x00) may be interpreted by the ONU as an RI value of about '00'; an RI field 1044 set to '0000 1111' (e.g., 0x0F) may be interpreted by the ONU as an RI value of about '01', and an RI field 1044 set to '1111 0000' (e.g., 0xF0) may be interpreted by the ONU as an RI value of about '10'. Consequently, ONUs operating at a reduced rate equal to about ¼ the nominal rate may be configured as follows: responsive to an RI value of about '00' (e.g., corresponding to an RI field 1044 set to about 0x00), transitioning back to the normal operation mode such that downstream data is received at the nominal data rate; responsive to an RI value of about '01' (e.g., corresponding to an RI field 1044 set to about 0X0F), transitioning to a reduced data rate equal to about ½ the nominal rate; responsive to an RI value of about '10' (e.g., corresponding to an RI field 1044 set to about 0XF0), maintaining a reduced data rate equal to about ¼ the nominal rate. In some embodiments, the PLOAM message 1040 may only be sent to indicate a rate change, and hence may never comprise an RI value of about '10'. In other embodiments, the PLOAM 1030 may be sent periodically to prevent a time-out, and hence may comprise an RI value of about '10' to indicate that the ONU should maintain a reduced rate equal to about ¼ the nominal rate.

Notably, ONUs operating in the normal operation mode may be configured to discard the PLOAM message 1040 for reasons similar to those discussed above with regards to the PLOAM message 1030 (e.g., the first three octets of the first field 1041 comprise 'FF FF FF'). Similarly, ONUs operating at a reduced rate equal to about ½ the nominal data rate may be configured to discard the PLOAM message 1040 due to the first four octets of the first field 1041 being set to 'FF FF FF FF'. Specifically, ONUs operating at a reduced rate equal to about ½ the nominal data rate may interpret the first four octets of the first field 1041 as indicating that the PLOAM message 1040 is a broadcast message (e.g., a BMI field 1031 set to 'FF FF') specifying an ONU ID of 'FF' (e.g., an ONU ID field 1033 set to 'FF FF'), and hence may drop the PLOAM message 1040, e.g. since no ONUs may be assigned an ONU ID of 'FF' as would be consistent with ITU-T G.984.3. Table 2 summarizes the lengths of the fields for the PLOAM messages 1030 and 1040

TABLE 2

Lengths Of Fields In PLOAM Message 1030 and 1040

| PLOAM | Data Rate | First Field | ONU ID | RI | Data | CRC |
|---|---|---|---|---|---|---|
| 1030 | ½ of nominal | 16 bits | 16 bits | 8 bits | 48 bits | 16 bits |
| 1040 | ¼ of nominal | 32 bits | 32 bits | 8 bits | — | 32 bits |

Figure 11:
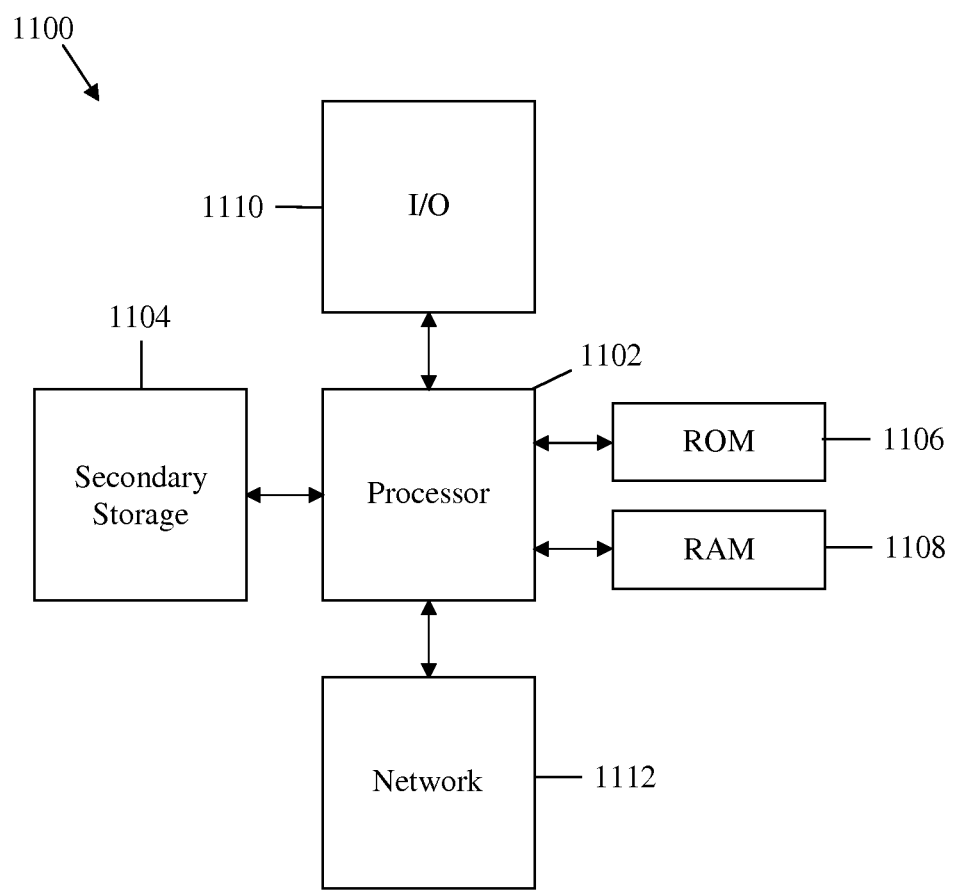
FIG. 11 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 11 illustrates a typical, general-purpose network component suitable for implementing one or more embodiments of a node disclosed herein. The network component 1100 includes a processor 1102 (which may be referred to as a central processor unit or CPU) that is in communication with memory devices including secondary storage 1104, read only memory (ROM) 1106, random access memory (RAM) 1108, input/output (I/O) devices 1110, and network connectivity devices 1112. The processor may be implemented as one or more CPU chips, or may be part of one or more application specific integrated circuits (ASICs).

The secondary storage 1104 is typically comprised of one or more disk drives or tape drives and is used for non-volatile storage of data and as an over-flow data storage device if RAM 1108 is not large enough to hold all working data. Secondary storage 1104 may be used to store programs that are loaded into RAM 1108 when such programs are selected for execution. The ROM 1106 is used to store instructions and perhaps data that are read during program execution. ROM 1106 is a non-volatile memory device that typically has a small memory capacity relative to the larger memory capacity of secondary storage 1104. The RAM 1108 is used to store volatile data and perhaps to store instructions. Access to both ROM 1106 and RAM 1108 is typically faster than to secondary storage 1104.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An Optical Network Unit (ONU), the ONU comprising:
a receiver module comprising a component and configured to receive a first rate selection signal from an optical line terminal (OLT) prior to receiving a downstream signal from the OLT at a reduced data rate that indicates a reduced rate mode, wherein the first rate selection signal is received in a first frame, and wherein the reduced data rate downstream signal is received in a second frame subsequent to the first frame,
wherein the component comprises a feedback amplifier and is configured to transition from a normal operation mode to the reduced rate mode in response to the receiver module receiving the first rate selection signal,
wherein the transition comprises adjusting a characteristic of the feedback amplifier,
wherein adjusting the characteristic of the feedback amplifier comprises adjusting a supply voltage of the feedback amplifier,
wherein operating in the normal operation mode comprises receiving the downstream signal from the OLT at a nominal data rate, and
wherein operating in the reduced rate mode comprises receiving the downstream signal from the OLT at the reduced data rate that is less than the nominal data rate but greater than zero.

2. The ONU of claim 1, wherein the ONU further comprises an optical transmitter, wherein the component comprises an optical receiver, and wherein receiving the downstream signal from the OLT at the reduced data rate substantially reduces the optical receiver's rate of power consumption.

3. The ONU of claim 1, wherein adjusting a characteristic of the feedback amplifier reduces the feedback amplifier's rate of power consumption.

4. The ONU of claim 3, wherein adjusting the characteristic of the feedback amplifier causes the feedback amplifier's frequency response to be affected such that the ONU can no longer receive the downstream signal at the nominal data rate.

5. The ONU of claim 4, wherein adjusting the characteristic of the feedback amplifier further comprises reducing a bias current of the feedback amplifier.

6. The ONU of claim 1, wherein the first rate selection signal comprises a first physical layer operations, administration, and maintenance (PLOAM) message comprising:
a message identification field specifying that the first PLOAM message is a reduced rate mode type message; and
a first rate indication field specifying the reduced data rate.

7. The ONU of claim 1, wherein the receiver module is further configured to receive a second rate selection signal from the OLT, wherein the second rate selection signal indicates the normal operation mode, and wherein the component is further configured to transition from the reduced rate operation mode to the normal operation mode in response to the receiver module receiving the second rate selection signal.

8. The ONU of claim 1, wherein the component is further configured to maintain a clock synchronization with the OLT when transitioning from the normal operation mode to the reduced rate mode, and wherein the clock synchronization is derived from the downstream signal.

9. A method executed by an optical network unit (ONU) in a passive optical network (PON), the method comprising:
receiving a downstream signal from an optical line terminal (OLT) while operating in a normal operation mode, wherein the downstream signal is received at a nominal data rate while operating in the normal operation mode;

transitioning from the normal operation mode to a reduced rate mode upon receiving a first rate selection signal from the OLT prior to receiving a downstream signal from the OLT at a reduced data rate, wherein the first rate selection signal is received in a first frame, wherein the reduced data rate downstream signal is received in a second frame subsequent to the first frame, and wherein the transitioning comprises adjusting a supply voltage of a feedback amplifier in the ONU; and receiving the downstream signal at a reduced data rate subsequent to transitioning from the normal operation mode to the reduced rate mode, wherein the reduced data rate is less than the nominal data rate, and wherein the ONU consumes power at a substantially lower rate while operating in the reduced rate mode than while operating in the normal operation mode.

10. The method of claim 9, wherein the downstream signal's line rate corresponds to the nominal data rate subsequent to transitioning from the normal mode to the reduced rate mode, and wherein a channel assigned to the ONU is line coded such that the channel has an effective data rate that is equal to the reduced data rate.

11. The method of claim 9, wherein the first rate selection signal comprises a physical layer operations, administration, and maintenance (PLOAM) message comprising:
a broadcast message indication field comprising one octet;
a rate reduction message type field comprising one octet;
an ONU identification (ID) field comprising one octet;
a rate indication field comprising one octet;
a data field comprising eight octets; and
a Cyclical Redundancy Check (CRC) field comprising one octet.

12. The method of claim 11, wherein the rate indication field indicates that the reduced data rate is equal to ½ the nominal data rate, and wherein the method further comprises:
receiving a second rate selection signal from the OLT, wherein the second rate selection signal comprises a second PLOAM message comprising:
a first field comprising two octets, wherein the first field is set to 'FF FF';
a second ONU ID field comprising two octets wherein the second ONU ID field specifies an ONU ID value that is assigned to the ONU;
a second rate indication field comprising one octet;
a second data field comprising six octets; and
a second CRC field comprising two octets.

13. The method of claim 12 further comprising:
transitioning back to the normal operation mode when the second rate indication field is set to '00' to specify the nominal data rate;
transitioning from a first reduced data rate to a second reduced data rate when the second rate indication field is set to 'F0' to specify the second reduced data rate, wherein the first reduced data rate is equal to ½ the nominal data rate, and wherein the second reduced data rate is equal to ¼ the nominal data rate.

14. The method of claim 11, wherein the rate indication field indicates that the reduced data rate is equal to ¼ the nominal data rate, and wherein the method further comprises:
receiving a second rate selection signal from the OLT, wherein the second rate selection signal comprises a second PLOAM message comprising:
a first field comprising four octets, wherein the first field is set to 'FF FF FF FF';
a second ONU ID field comprising four octets;
a second rate indication field comprising one octet; and
a second CRC field comprising four octets.

15. An optical network unit (ONU) comprising a processor, wherein the ONU is configured to:
receive a downstream signal from an optical line terminal (OLT) while operating in a normal mode, wherein the downstream signal is received at a nominal data rate while operating in the normal operation mode;
transition from the normal operation mode to a reduced rate mode upon receiving a first rate selection signal from the OLT prior to receiving a downstream signal from the OLT at a reduced data rate, wherein the first rate selection signal is received in a first frame, wherein the reduced data rate downstream signal is received in a second frame subsequent to the first frame, and wherein the transition comprises adjusting a supply voltage of a feedback amplifier in the ONU;
receive the downstream signal at a reduced data rate subsequent to transitioning from the normal operation mode to the reduced rate mode, wherein the reduced data rate is less than the nominal data rate; and
consume power at a substantially lower rate while operating in the reduced rate mode than while operating in the normal operation mode.

16. The ONU of claim 15, wherein the downstream signal's line rate received by the ONU corresponds to the nominal data rate subsequent to transitioning from the normal mode to the reduced rate mode, and wherein a channel assigned to the ONU is line coded such that the channel has an effective data rate that is equal to the reduced data rate.

17. The ONU of claim 15, wherein the first rate selection signal comprises a physical layer operations, administration, and maintenance (PLOAM) message comprising:
a broadcast message indication field comprising one octet;
a rate reduction message type field comprising one octet;
an ONU identification (ID) field comprising one octet;
a rate indication field comprising one octet;
a data field comprising eight octets; and
a Cyclical Redundancy Check (CRC) field comprising one octet.

18. The ONU of claim 17, wherein the rate indication field indicates that the reduced data rate is equal to ½ the nominal data rate, and wherein the processor is further configured to:
receive a second rate selection signal from the OLT, wherein the second rate selection signal comprises a second PLOAM message comprising:
a first field comprising two octets, wherein the first field is set to 'FF FF';
a second ONU ID field comprising two octets wherein the second ONU ID field specifies an ONU ID value that is assigned to the ONU;
a second rate indication field comprising one octet;
a second data field comprising six octets; and
a second CRC field comprising two octets.

19. The ONU of claim 18, wherein the ONU is further configured to:
transition back to the normal operation mode when the second rate indication field is set to '00' to specify the nominal data rate; and
transition from a first reduced data rate to a second reduced data rate when the second rate indication field is set to 'F0' to specify the second reduced data rate, wherein the first reduced data rate is equal to ½ the nominal data rate, and wherein the second reduced data rate is equal to ¼ the nominal data rate.

20. The ONU of claim 17, wherein the rate indication field indicates that the reduced data is equal to ¼ the nominal data rate, wherein the processor is further configured to receive a second rate selection signal from the OLT, and wherein the second rate selection signal comprises a second PLOAM message comprising:
  a first field comprising four octets, wherein the first field is set to 'FF FF FF FF';
  a second ONU ID field comprising four octets;
  a second rate indication field comprising one octet; and
  a second CRC field comprising four octets.

* * * * *